United States Patent
Dragic

(10) Patent No.: US 10,240,575 B2
(45) Date of Patent: Mar. 26, 2019

(54) OCEAN WAVE POWER PLANT

(76) Inventor: Mile Dragic, Sremska Kamenica (RS)

( * ) Notice: Subject to any disclaimer, the term of this patent is extended or adjusted under 35 U.S.C. 154(b) by 516 days.

(21) Appl. No.: 13/810,579

(22) PCT Filed: Jul. 15, 2011

(86) PCT No.: PCT/EP2011/062155
§ 371 (c)(1),
(2), (4) Date: Jan. 16, 2013

(87) PCT Pub. No.: WO2012/010518
PCT Pub. Date: Jan. 26, 2012

(65) Prior Publication Data
US 2013/0127168 A1 May 23, 2013

(30) Foreign Application Priority Data

Jul. 19, 2010 (EP) .................................. 10170001

(51) Int. Cl.
*F03B 13/18* (2006.01)
(52) U.S. Cl.
CPC ........ *F03B 13/1855* (2013.01); *F03B 13/186* (2013.01); *F03B 13/1885* (2013.01);
(Continued)
(58) Field of Classification Search
CPC F03B 13/1855; F03B 13/186; F03B 13/1885; F03D 1/005; F05B 2260/02; B63B 322/06
(Continued)

(56) References Cited

U.S. PATENT DOCUMENTS 639,734 A 12/1899 Johnson
1,364,619 A 1/1921 Dolliver
(Continued)

FOREIGN PATENT DOCUMENTS

CA 2436187 1/2005
CN 101460733 6/2009
(Continued)

OTHER PUBLICATIONS

Vantorre, "Modelling of hydraulic performance and wave energy extraction by a point absorber in heave," *Applied Ocean Research*, 26: 61-72 (2004).

*Primary Examiner* — Michael Leslie
*Assistant Examiner* — Matthew Wiblin
(74) *Attorney, Agent, or Firm* — Barnes & Thornburg LLP; Mark J. Nahnsen

(57) ABSTRACT

An ocean wave power plant provided for by respective interconnected functional units comprising a support structure (1*a*, 1*b*) is disclosed. The support structure (1*a*, 1*b*) is terminated in a lower end with a fastening bracket (9*c*) which can be anchored in a single point to a mass (9*e*) when deployed in the sea. A submergible uplift floating body (2) is providing buoyancy for the ocean wave power plant when deployed in the sea. The a uplift floating body (2) is attached to the support structure (1*a*, 1*b*), an electric power generating subsystem (A) supported by a platform (8) is terminating the support structure (1*a*, 1*b*) in an upper end of the support structure. A transmission member (4, 4*a*, 18) is attached in one end to a floating body (3) and in another end to the power generating subsystem (A) transferring wave motion from the floating body (3) to the power generating subsystem (A).

17 Claims, 29 Drawing Sheets

(52) U.S. Cl.
CPC ..... *F05B 2220/706* (2013.01); *F05B 2260/02* (2013.01); *Y02E 10/38* (2013.01)

(58) Field of Classification Search
USPC .......................................... 60/398, 496–507
See application file for complete search history.

(56) References Cited

U.S. PATENT DOCUMENTS

| | | | |
|---|---|---|---|
| 1,393,472 A | | 10/1921 | Williams |
| 1,711,103 A | | 4/1929 | Smith |
| 1,816,044 A | | 7/1931 | Gallagher |
| 1,823,190 A | | 9/1931 | Neil |
| 2,749,085 A | | 6/1956 | Searcy |
| 2,783,022 A | | 2/1957 | Salzer |
| 3,567,953 A | | 3/1971 | Lord |
| 3,880,105 A | * | 4/1975 | Bryant ................. 114/294 |
| 3,930,168 A | * | 12/1975 | Tornabene ............. 290/53 |
| 4,145,885 A | | 3/1979 | Solell |
| 4,184,336 A | | 1/1980 | Lamberti |
| 4,232,230 A | | 11/1980 | Ames |
| 4,241,579 A | | 12/1980 | Borgren |
| 4,364,715 A | | 12/1982 | Bolding |
| 4,389,843 A | | 6/1983 | Lamberti |
| 4,539,484 A | | 9/1985 | Suggs |
| 4,672,222 A | | 6/1987 | Ames |
| 1,497,205 A | | 6/1994 | Boosinger |
| 5,359,229 A | * | 10/1994 | Youngblood ............ 290/53 |
| 5,710,464 A | | 1/1998 | Kao et al. |
| 5,775,248 A | * | 7/1998 | Simola ................. 114/267 |
| 5,842,838 A | | 12/1998 | Berg |
| 6,208,035 B1 | * | 3/2001 | Kao .................... 290/42 |
| 6,857,266 B2 | * | 2/2005 | Dick .................... 60/496 |
| 6,935,808 B1 | | 8/2005 | Dempster |
| 9,016,055 B2 | | 4/2015 | Dragic |
| 2005/0022714 A1 | * | 2/2005 | Low .................... 114/297 |
| 2006/0080957 A1 | | 4/2006 | Gomez et al. |
| 2007/0080539 A1 | | 4/2007 | Kelly |
| 2007/0126239 A1 | * | 6/2007 | Stewart et al. .......... 290/53 |
| 2008/0309088 A1 | * | 12/2008 | Agamloh et al. ........ 290/53 |
| 2009/0146429 A1 | * | 6/2009 | Protter et al. .......... 290/53 |
| 2009/0211240 A1 | | 8/2009 | Patton |
| 2010/0043425 A1 | * | 2/2010 | Dragic ................. 60/504 |
| 2010/0259047 A1 | * | 10/2010 | Chi ..................... 290/53 |
| 2015/0211478 A1 | | 7/2015 | Dragic |

FOREIGN PATENT DOCUMENTS

| | | |
|---|---|---|
| CN | 101460734 | 6/2009 |
| DE | 2934288 | 3/1981 |
| DE | 3027593 A1 | 2/1982 |
| DE | 19515138 | 10/1996 |
| FR | 459312 | 11/1913 |
| FR | 490041 | 3/1919 |
| FR | 538736 | 6/1922 |
| FR | 655131 | 4/1929 |
| FR | 872125 | 5/1942 |
| FR | 2392174 | 12/1978 |
| GB | 15279 | 12/1913 |
| GB | 03691 | 2/1914 |
| GB | 191403691 | 3/1915 |
| GB | 1515744 | 6/1978 |
| GB | 2027815 | 2/1980 |
| GB | 2056574 | 3/1981 |
| JP | 61-226572 | 10/1986 |
| JP | H10-238450 | 9/1998 |
| JP | 2005-098233 | 4/2015 |
| KR | 10-2007-0098300 | 10/2007 |
| WO | WO 2004/083031 | 9/2004 |
| WO | WO 2005/012723 | 2/2005 |
| WO | WO 2005/108778 | 11/2005 |
| WO | WO 2007/042793 | 4/2007 |
| WO | WO 2007125307 | 11/2007 |
| WO | 2007/139395 A1 | 12/2007 |
| WO | 2009/022930 A1 | 2/2009 |
| WO | 2010/067137 A1 | 6/2010 |

* cited by examiner

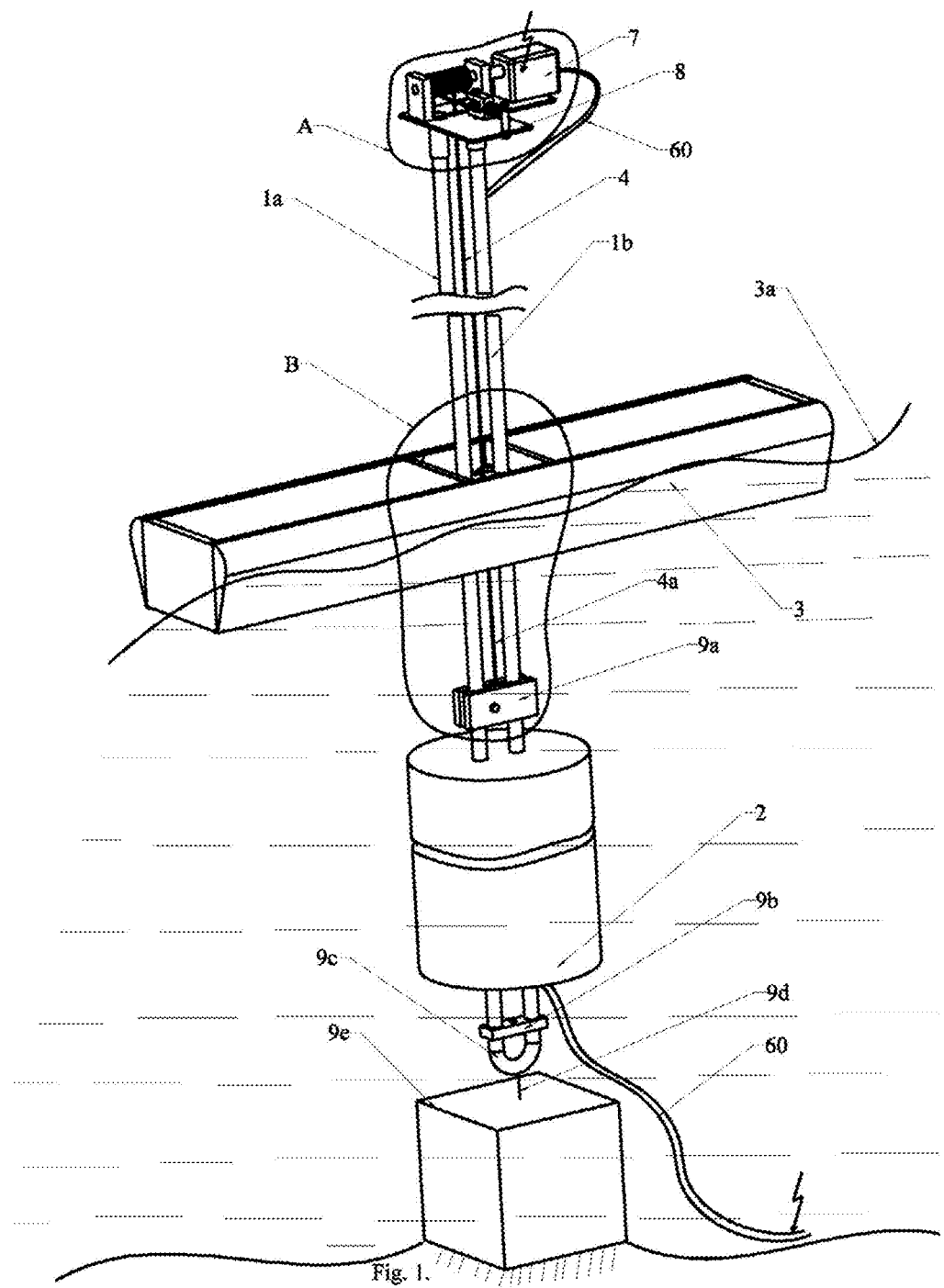

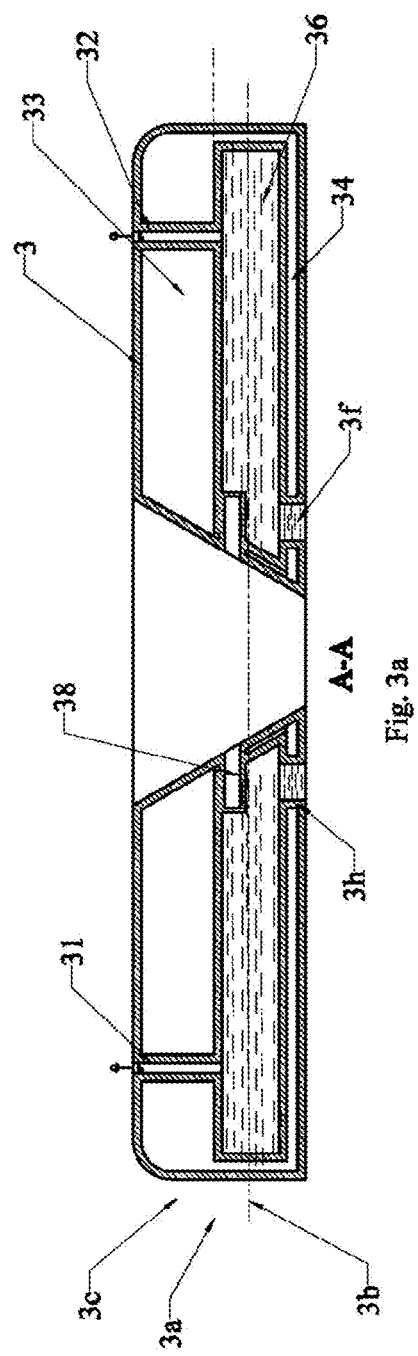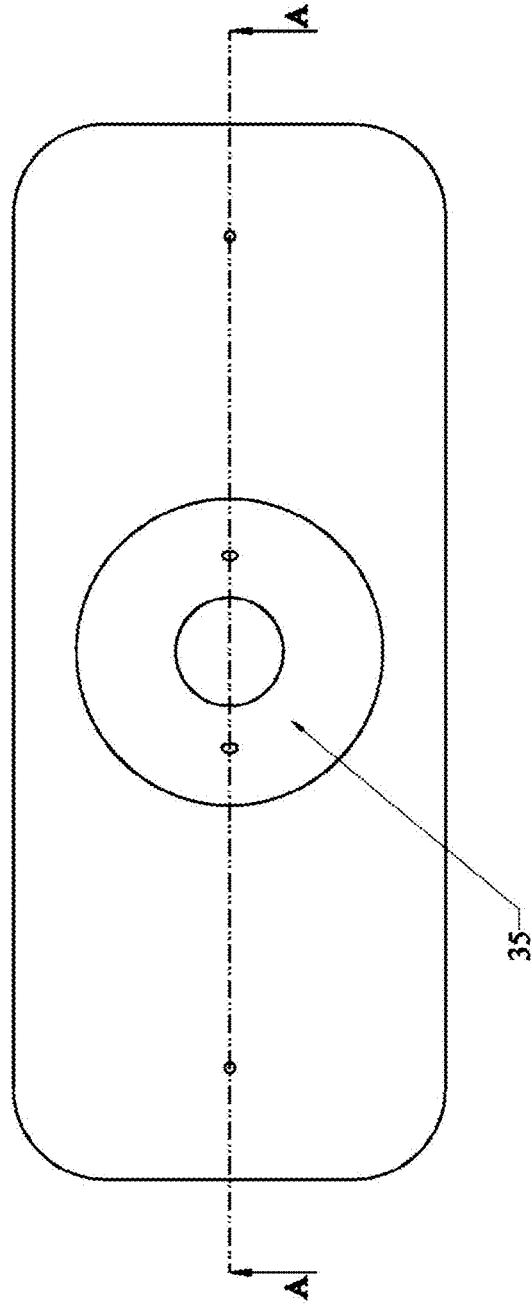
Fig. 3a
Fig. 3

Fig.: 12

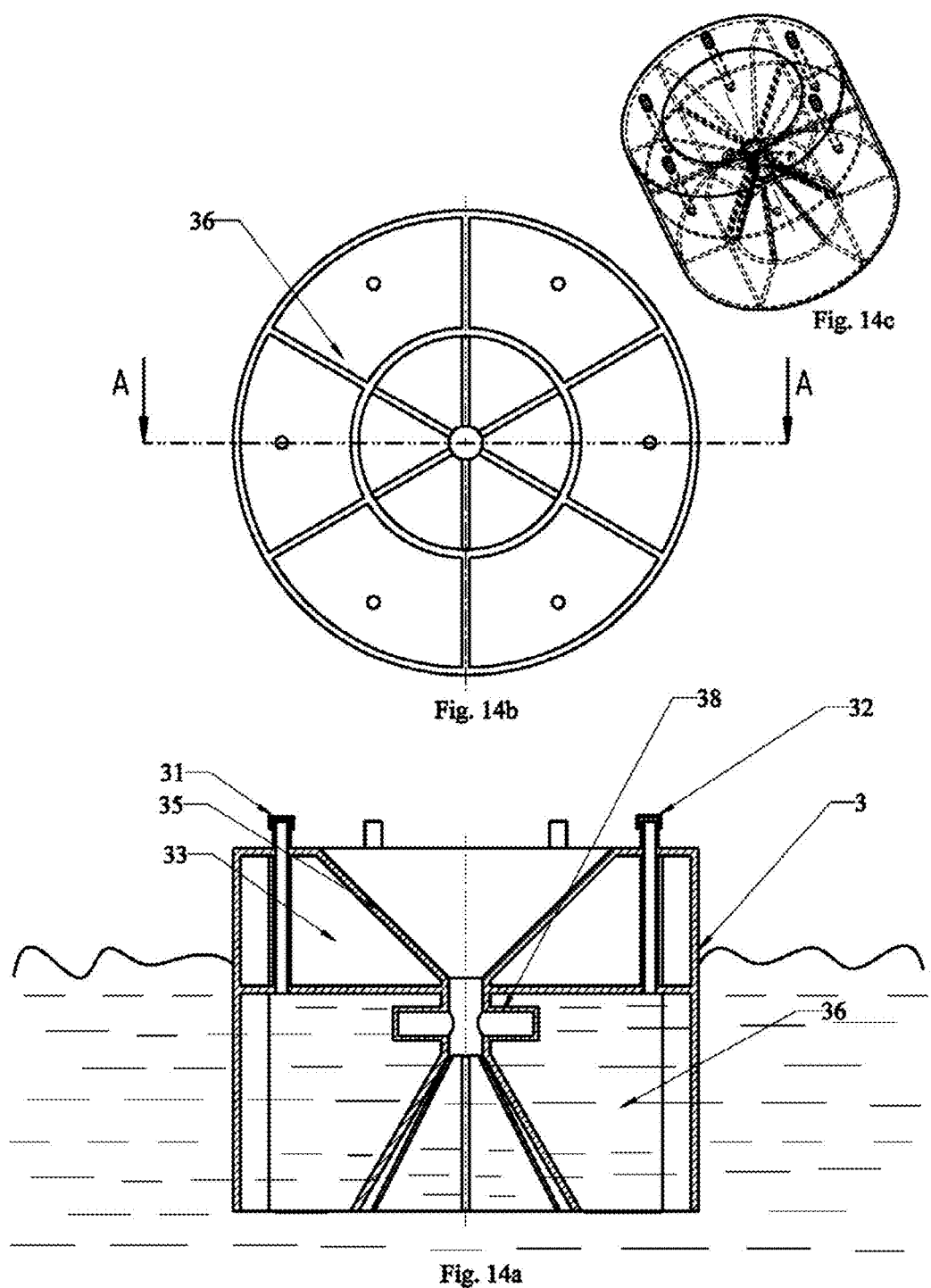

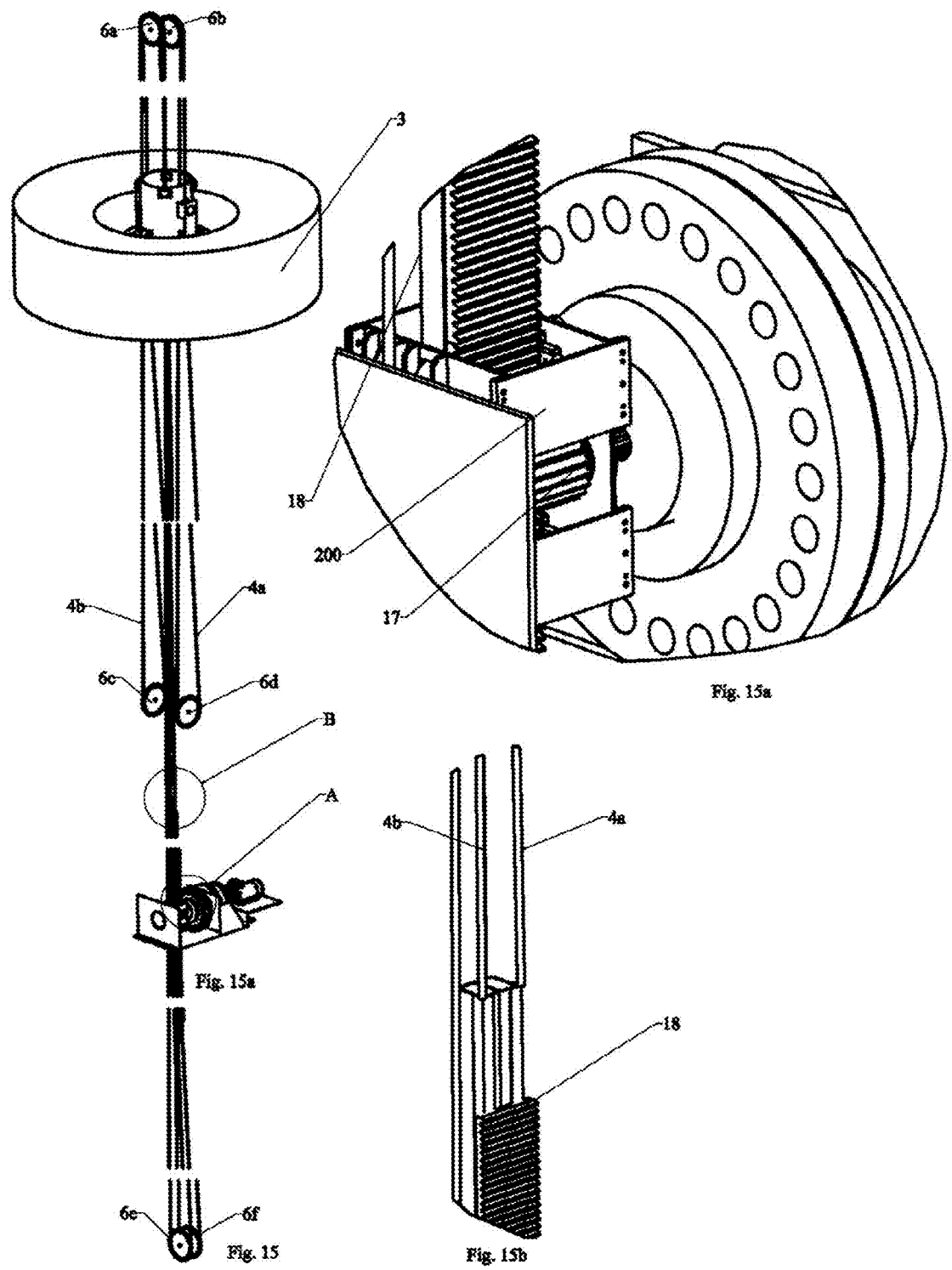

OCEAN WAVE POWER PLANT

CROSS-REFERENCE TO RELATED APPLICATIONS

This application is a U.S. National Stage of International Application No. PCT/EP2011/062155, filed Jul. 15, 2011, which claims the benefit of European Patent Application No. 10170001.1, filed on Jul. 19, 2010, both of which are incorporated herein by reference in their entireties.

FIELD OF THE INVENTION

The present invention relates to an ocean wave power plant and a method for deployment thereof, wherein the ocean power plant comprises a floating body collecting wave energy from ocean waves, and especially to an ocean wave power plant comprising at least one support member for the wave power plant, wherein the at least one support member is arranged and located through a centrally located hole in the floating body, wherein the hole in the floating body provides a passage from a top side of the floating body to the bottom side of the floating body, wherein the method comprises steps for attaching a self lifting anchor to the ocean wave power plant, and steps for positioning the ocean power plant on the ocean sea bed using the self lifting anchor.

BACKGROUND OF THE INVENTION

Ocean wave power plants of different designs are well known examples of alternative power sources compared to the more traditional power sources in prior art. However, there are very few commercial successfully installations of ocean power plants. The ocean power plants are preferably installed in parts of the ocean providing a steady condition of waves. This implies that preferable locations are the areas of the ocean with harsh weather conditions. This implies that an ocean wave power plant needs to be a durable and strong construction which increases the cost of building the installation and also often the cost of maintaining the installation.

Therefore, the efficiency of the energy production of the wave power plant is of outmost importance. Even though the functioning of a wave power plant is simple to understand for a person skilled in the art it has proved to be a challenge to improve the efficiency of such installations. The cost of the installation, expected maintenance costs etc. must be compared with the probable production outcome of energy, and the energy production must be economically competitive compared with the more traditional power sources providing energy for the market to be able to be regarded as a true alternative power source.

Improving the economy of ocean wave power plants implies that the installations should be cheaper to build and install, and at the same time be able to withstand environmental conditions. Further, the maintenance cost should be lowered and the efficiency of converting wave motions into for example electric energy should be improved. Improving and/or reducing complexity of the technical design of ocean wave power plants does not only improve the economy of ocean wave power plants, but it is also a significant contribution to the emerging field of environmental friendly sustainable technologies for the future.

U.S. Pat. No. 5,359,229 discloses an apparatus that converts wave motion to electrical energy comprising a series of conversion units being interconnected thereby providing continuous rotation of a drive shaft being connected to an electrical generator. Each conversion unit comprises a pylon having a lower portion submerged beneath the surface of a body of water and a top portion extending above the surface of the water. The pylon is held in a fixed position relative to the surface of the water by anchoring the pylon to the floor of the body of water. Attached to the pylon is a float which rises and falls with the rise and fall of waves on the surface of the body of water. The float has a generally spherical exterior and an internal cavity. Ballast such as water is contained within the internal cavity to provide weight to the float. The float further has a central opening through its vertical axis. Mounted within the central opening is a central guide means having a guide sleeve and a plurality of bearings secured to the guide sleeve. The central guide means allows the float to be telescopically fitted around the pylon. The float is thus guided so that it will slide up and down the pylon in a direction parallel to the vertical axis of the pylon. The fixed position of the pylon by the anchoring makes the design vulnerable to harsh weather conditions and the pylon must be able to resist strong forces due to possible huge waves. Even though waves can wash over the installation the plurality of floats will in combination when all are lifted simultaneous have a combined buoyancy force that can tear one or more pylons apart.

U.S. Pat. No. 6,935,808 describes a breakwater for dissipating ocean wave energy and/or for converting such energy into electrical power. The breakwater presented is said to be easier and less expensive to build than existing solutions, which can be constructed in one location and then towed to a desired location and installed there. In one aspect the invention is directed to an apparatus for dissipating waves in the ocean that includes a base anchored to the ocean floor. A tower extends up from the base, with a panel being pivotally attached to the top of the tower, so as to be capable of rocking back and forth. A buoyant element is disposed at the rear edge of the panel, and the panel is configured such that the rear edge of the panel remains above the surface of the ocean and the front edge remains in the ocean when the panel is in its normal state. To facilitate a breakwater that can be more easily installed than a conventional breakwater, the base has variable buoyancy that can be altered by pumping air into the base or venting air out of it. The base includes a plurality of cells having open bottoms into which the air may be pumped and from which the air may be vented. As a result, the base typically will be capable of being manufactured relatively easily and inexpensively. However, the design is intended only for shallow water close to beaches and the design with a defined length of the arm with two opposite located floats makes it only operate properly at certain ocean wave frequencies. If the opposite located floats are lifted or lowered simultaneously by the wave motion, the arm will not move.

US 2783022 from Feb. 26, 1957 by A. Salzer disclose an ocean wave power plant comprising a float resting on the surface of the ocean. Waves respectively lift or lower the float. This movement of the float is transferred via a shaft connected in one end to the float and in the other end to a rack and pinion gear providing a rotational movement of a shaft connected to the pinion gear. The rotational movement of the shaft is therefore correlated with the movement up or down of the float which implies a bidirectional rotation of the shaft back and forth. The disclosed design comprises a deck providing a support for the installation. The position of the deck above the level of the ocean surface may be adjusted. However, the connection point of the shaft to the top surface of the float is subject to strong forces from wave motions and lateral force components from the wave motions may tend to provide ware and tear of the shaft connection of the rack and pinion gear.

U.S. Pat. No. 4,672,222 from Jun. 9, 1987 by P. Foerds Ames comprises a submergible wave power plant installation comprising tubular members approximately forming edge elements of a tetrahedral frustum, and a buoyancy element supported by further tubular members fixed to the bottom part of the installation. The design is self stabilizing, can withstand harsh weather conditions, is modular, and comprises independently operative point absorbers with respective drive mechanisms and electric generators producing electric power from wave motions on a surface of a body of water. The modular design of this ocean wave power plant enable adjacent positioning of the respective modules side by side, wherein the electric power generated in each respective module is summed together and outputted as coming from one power source only. However, the design provides an implicit constraint on the size of the floating body 54 as depicted in FIG. 1 of the disclosure. This limits the amount of energy that can be taken out of the waves form one embodiment of the design. The ability to provide an interconnected plurality of modules, wherein each respective module produces electric energy will of course increase the power output from an installation according to this disclosure. However, the installation tends to be very large covering a substantial part of the ocean surface. Therefore, the cost is high and maintenance is a problem in an interconnected system when a module that is surrounded by other modules need service.

PCT/RS2007/000015 from Aug. 13, 2007 by Mile Dragic disclose a design providing conversion of linear motion up and down of a floating body resting on a body of water, wherein the conversion of the linear motion is provided for by an electric linear induction system or by converting the linear motion into a rotational motion driving an electric generator, for example. A floating body is connected either with a fixed rod or shaft, or a flexible transmission member (wire) to a point on or below the barycentre of the floating body, and in the other end to a generator system producing electric energy when the floating body is lifted up or lowered down by the wave motions. However, the inventor of the present invention has realised that even though the teaching of this patent application provides a significant improvement over prior art, the question of providing a simpler design remains. For example, in this disclosure the support structure comprises a horizontal top beam connected to vertical side beams resting for example on the sea bed. The size of the floating body dictates the possible power output, and hence the size of the support structure, for example the length of the top beam must be increased to allow a certain size of a floating body (or energy output). This may imply a costly design of for example the top beam to provide a stable design that can withstand the size and weight of the floating body, different weather conditions, and at the same time deliver on target for the power production.

There exist some examples in prior art providing teaching about how to convert bi-directional movement of a shaft into unidirectional rotation of a shaft, for example. It is known how to transform the movements back and forth of a piston, for example in an engine for a car. However, these prior art engine solutions requires for example that a rod connected to a piston in the engine can move back and forth in a direction perpendicular to the direction of the movements back and forth of the piston to be able to turn a cam shaft in the engine into a unidirectional rotation. If this additional freedom of motion is constrained, this solution of transforming the piston movement into a unidirectional rotational motion of a shaft is difficult to achieve.

The teaching of U.S. Pat. No. 4,145,885 from Nov. 23, 1977 by Solell disclose a design comprising freewheel devices, gears and chains to combine a first rotation direction of a first shaft and a second rotation direction of a second shaft into a unidirectional rotation of a third shaft. The first rotation direction could be provided for by the movement of a float upwards while the second rotation direction could be provided for when a float moves downwards, for example. However, it is well known by a person skilled in the art that any gear and shaft connection provides a sort of friction in a mechanical system, which in this case provides a loss or decrease of possible power output from an ocean wave power plant. In the theory of power transfer it is well known that the coefficient of efficiency for gear pair is typically 98% and from a chain pair the efficiency is typically 97%, i.e. 1% of wasted energy per pair if a design cannot omit chains. The teaching of U.S. Pat. No. 4,145,885 comprises an installation of a wave power plant at sea wherein a shaft is connected between a supporting deck and the sea bottom. A floating body is arranged to move up and down along this fixed shaft. In this manner vertical force components cannot move the floating body from side to side.

Further, it is obvious that any design that reduces the number of gears that are necessary to use in an ocean wave power plant actually increases the efficiency of the power production itself. In this cited disclosure there is a combination of chains and gears that in itself adds an additional typical 3% to 4% loss of energy as known to a person skilled in the art. Further, in wave power plants shafts etc. are subject to variable speeds due to variable wave conditions. These variations can be abrupt and therefore damage on different parts of a wave power plant may appear as known in prior art, for example. Therefore, it is further obvious that any reduction of gears, choice of technology in the transfer mechanism of energy etc. directly influence cost of production of the installation, maintenance costs and stability of the installation during use of the installation, and may provide an increase of produced power which significantly adds to the profitability of an installation of this kind.

The technical challenge of converting a bidirectional movement of a transmission member interconnecting a float with a mechanism transferring energy of the waves, for example by providing a unidirectional rotation of a shaft, is mainly related to the fact that the length of a stroke of the transmission shaft up or down is strongly variable and are in fact directly related to the amplitude of the ocean waves. Therefore, the use of a cam shaft as known from motor engines is for example difficult to use as readily understood by a person skilled in the art. The use of freewheel devices, gears, chains etc. is known remedies for solving this technical challenge. However, the possible large amplitudes of the waves and the corresponding strong forces make these designs very complicated. The consequence is not that such designs will not function, but that there might be a significant loss of power in the conversion chain due to the number of parts, size of parts etc. It is also a design challenge that the amplitude of the ocean waves might be small. This implies that small amounts of wave energy should preferably be able to be converted by the mechanism in use. This implies that the loss in the conversion chain must be low. The ability to utilize small wave amplitudes is of outmost importance for an ocean power plant to be regarded as a sustainable alternative power source.

When a floating body of an ocean wave power plant is lifted by wave amplitudes that are increasing, it is actually the action of the water itself that is lifted in the wave that is picked up by the floating body. When the floating body is lowered when wave amplitudes are reduced, it is actually the weight of the floating body itself that is providing a drive of the conversion chain since the floating body actually is falling down. It is readily understood that a sufficient weight of the floating body is necessary to achieve an efficient conversion of energy. In prior art it is common to use a large sized body for the float, ref. PCT/RS2007/000015. However, it is a challenge to meet the requirement of providing both buoyancy and weight. When waves lift the floating body upwards it is the buoyancy of the body that provides the weight (the weight of the water) and therefore any torque on an input shaft of a connected generator. This is best achieved with a huge light weight body as known to a person skilled in the art. When the floating body falls downwards it is the weight of the floating body that drives the machinery. However, the increased weight of the floating body may make the floating body subject to damages when experiencing slamming. Slamming is a well known problem in ship design and off shore design. It is possible that a part of a bottom surface of a floating body leaps out of the water due to the wave motions. When the floating body falls down again the bottom surface of the floating body will hit the surface of the water. This impact can provide damages to the installation and the floating body itself. Therefore, safety issues provides that if a floating body leaps out of water the water inside the floating body should be emptied to mitigate the effect of possible slamming.

Therefore it is a need for an improved design of a floating body transferring wave energy in an ocean wave power plant.

According to another aspect of the present invention, a further optimization of energy conversion of a wave power plant may be accomplished by providing a synchronization (or resonance condition) of the movement up and down of a floating body with the frequency of the wave system on the surface of the water the floating body is resting on. In the article "Modelling of hydraulic performance and wave energy extraction by a point absorber in heave" by M. Vantorre et. al. published in Applied Ocean Research 26 (2004) 61-71, it is disclosed theoretical calculations illustrating how a resonant wave power system provides a significant increased extraction of energy. However, there is no indication how to provide a technical solution providing this kind of optimization of energy extraction.

According to an example of embodiment of the present invention, a flywheel is arranged such that the flywheel rotates in a respective direction correlated with a direction of movement respectively up or down of a transmission member connected to a floating body of the ocean power plant. The inertia of the flywheel will then provide a delay of the movement when the floating body turns its direction of rotation. For example, when the floating body is lifted upwards the inertia of the flywheel provided for by the rotation in a direction correlated with the movement upwards of the transmission member, will hold back the floating body a short time interval when the wave lifting the floating body starts to fall downwards again. The movement downwards will of course force the flywheel to rotate in an opposite direction. The inertia of the flywheel will then delay this change of rotational direction. The same situation occurs when the floating body is at its lowest position and starts to be lifted again by the waves. The effect of this delay is to provide a synchronization of the movement of the wave system on the water surface with the natural frequency of the wave power plant system, wherein the weight of the flywheel directly is correlated with the necessary weight.

It is an aspect of the present invention to combine a supporting structural design of an ocean wave power plant that provides a simplification of the support structure, with an optimized wave energy conversion chain and an adapted design of a floating body that can be used in embodiments of the structural design according to the present invention.

It is further an aspect of the present invention to provide an optimized and economical feasible method for deployment of the ocean wave power plant on an ocean sea bed.

Hence, an improved ocean wave power plant would be advantageous, and in particular a more efficient and/or reliable ocean wave power plant would be advantageous.

OBJECT OF THE INVENTION

It is a further object of the present invention to provide an alternative to the prior art.

In particular, it may be seen as an object of the present invention to provide an ocean wave power plant that solves the above mentioned problems of the prior art with a design of an ocean wave power plant that minimises structural size of an installation, minimises impact of environmental conditions on structural parts of an installation, and at the same time reduces internal loss of power output due to operative mechanical parts in an installation.

Further, it can be seen to be an object of the present invention to provide an improved design of a floating body.

Further, it can be seen as an object of the present invention to provide a simpler and more efficient transformation of bidirectional motion of a transmission member connected to a respective up and down moving floating body into a unidirectional motion of a shaft connected to for example an electric power generator.

Further, it can be seen as an object of the present invention to provide a synchronization between a dominant ocean wave frequency and the natural frequency of an ocean wave power plant located on a specific location.

Further, it can be seen as an object of the present invention to provide a simple and economical feasible method for deployment of an ocean wave power plant on a specific sea bed location.

SUMMARY OF THE INVENTION

Thus, the above described object and several other objects are intended to be obtained in a first aspect of the invention by providing an ocean wave power plant comprising a floating body with a centrally located through hole, wherein at least one support structure is arranged through said through hole, wherein a constraining device or a constraining arrangement is located in the through hole guiding movements in three dimensions of the floating body supported by the at least one support structure. The floating body comprises at least a first cavity that is filled with water and at least a second cavity filled with air during operation. Further, the installation may be deployed and anchored with the help of a self lifting anchor and an associated method comprising using this self lifting anchor.

The invention is particularly, but not exclusively, advantageous for obtaining a cost effective ocean power plant with reduced needs for maintenance, which at the same time reduces loss of produced power due to simplifications of respective operative mechanical parts and interconnections of respective mechanical parts.

According to an example of embodiment of the present invention an ocean wave power plant is provided for by respective interconnected functional units comprising a support structure 1a, 1b terminated in a lower end with a fastening bracket 9c to be anchored in a single point to a mass 9e when deployed in the sea, a submergible uplift floating body 2 providing buoyancy for the ocean wave power plant when deployed in the sea, wherein the uplift floating body 2 is attached to the support structure 1a, 1b, an electric power generating subsystem A supported by a platform 8 terminating the support structure 1a, 1b in an upper end of the support structure, a transmission member 4, 4a, 18 is attached in one end to a floating body 3 and in another end to the power generating subsystem A transferring wave motion from the floating body 3 to the power generating subsystem A, wherein the support structure 1a, 1b, the floating body 3, the uplift floating body 2, the fastening bracket 9c, the power generating subsystem A, the mass 9e, at least a part of the transmission member 4, 4a, 18 is arranged functionally interconnected along a common axis, wherein each respective functional unit is arranged as weight symmetrically as possible around the common axis, wherein the support structure 1a, 1b is guided through a through hole in the floating body 3 and is fastened to the uplift floating body 2, wherein a motion constraining device 100 is arranged in the centre of the through hole, wherein the part of the transmission member 4, 4a, 18 that is arranged along the common axis in one end is connected to a centre point on a top side of the motion constraining device 100, and correspondingly further is continued to be arranged along the common axis from a connection to an opposite located centre position on a bottom side of the motion constraining device 100. The term "motion constraining device" referenced with the numeral 100 is to be understood to comprise all necessary arrangements and variations of arrangements for connecting the floating body to a transmission member in such a way that the motion up and down of the floating body provides optimized transfer of energy from the ocean waves. It is to be understood that the word "constraining" defines allowed movements in all directions of the floating body but with the "constraint" to optimize the transfer of energy. For example, an elongated shaped floating body will turn its longer side towards an incoming wave front. This is actually an optimized positioning of such a floating body to be able to optimize transfer of energy. Therefore it is important to "constrain" the motion in the horizontal plane to be free rotating such that an optimized positioning may be achieved. However, there will be a simultaneous tilting of the elongated shaped floating body in a vertical plane due to wave motions. Therefore, the tilting must be constrained not to harm the installation it is connected to. It is also important that this vertical constrainment do not have an impact on the horizontal motion. Even though it is possible to use a round shaped floating body the same arguments may be used for the same type of constrainment of the motion in the respective horizontal and vertical plane. However, free rotation in the horizontal plane should be allowed to mitigate abrupt changes of wave patterns which otherwise could be transferred to the installation if the horizontal motion was not free. In this context the term "motion constraining device" or "motion constraining arrangement" is meant to comprise any physical effect that is utilized to "constrain" the movement of the floating body in all directions, first of all to optimize transfer of energy but also to take into account possible safety issues.

According to an example of embodiment of the present invention, the natural frequency of the ocean wave power plant may be modified by adding a flywheel connected to a rotational axis provided for in the conversion chain of the wave motion to energy in the ocean wave power plant.

According to an aspect of the present invention, a method comprising steps for deploying an ocean wave power plant according to the present invention comprises steps for attaching a self lifting anchor to the ocean wave power plant structure, and then steps providing a placement of the ocean power plant on an ocean sea bed using the self lifting anchor.

Different respective aspects of the present invention may each be combined with other respective aspects. These and other aspects of the invention will be apparent from and elucidated with reference to the embodiments described hereinafter.

BRIEF DESCRIPTION OF THE FIGURES

The ocean wave power plant according to the present invention will now be described in more detail with reference to the accompanying figures. The figures illustrates some examples of embodiments of the present invention and is not to be construed as being limiting other possible embodiments falling within the scope of the attached claim set.

FIG. 1 illustrates an example of embodiment of the present invention.

FIG. 3 illustrates an example of embodiment of a floating body according to the present invention.

FIG. 3a illustrates a cross section along line AA in FIG. 3.

FIG. 4b illustrates details of the embodiment illustrated in FIG. 4a.

FIGS. 4c 4b illustrates variations of details of the embodiment illustrated in FIG. 4a FIG. 4d illustrates an example of a motion constraining device or motion constraining arrangement.

FIGS. 9 and 9a illustrates an example of embodiment illustrating how operating parts of an embodiment of the ocean wave power plant may be protected against environmental impacts.

FIG. 14a, 14b, 14c illustrates an example of embodiment of a floating body providing protection against slamming.

FIGS. 15, 15a and 15b illustrates details of arrangement of an example of embodiment comprising a transmission member comprising both a rack and a wire element.

DETAILED DESCRIPTION OF EMBODIMENTS

Figure 1A:
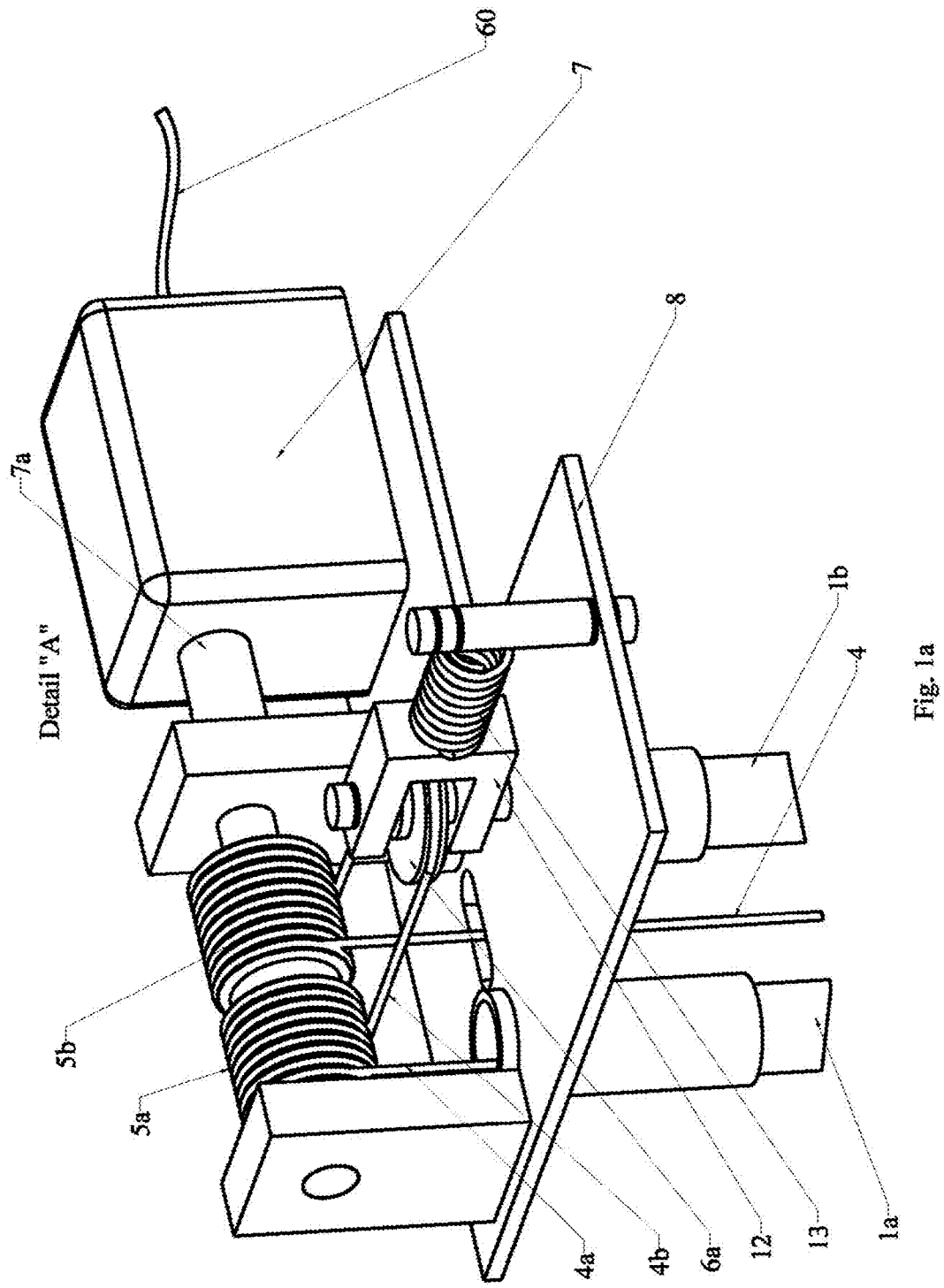
FIG. 1a illustrates a detail A of the embodiment illustrated in FIG. 1.

Although the present invention has been described in connection with specified embodiments, examples of embodiments should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and/or advantageous.

FIG. 1 illustrates an example of embodiment of the present invention. The design comprises a vertical central construction line going from the top to the bottom of the design, and all elements of support structures, weight distribution on the support structure etc. is preferably provide for in a symmetrical manner around this vertical central construction line. This construction line constitutes an axis of an embodied system that of course can be moved out of a vertical position when a system according to the present invention is deployed in open sea. The term "vertical" is only related to the design concept. The gravitational centre of the installation is preferably located on this central construction line.

The embodiment comprises a floating body 3 supported by a supporting structure 1a, 1b located through a through hole in the floating body 3, the support structure 1a, 1b is attached to a submerged uplift floating body 2 providing buoyancy for the whole installation, and the whole installation is firmly anchored to the sea bed with a mass 9e connected to the support structure via a chain, rope or wire etc. The mass 9e may be made of concrete, steel, etc. On top of the structure as depicted in FIG. 1, there is a power generating subsystem activated by a transmission member connected to the floating body 3. It is further within the scope of the present invention to provide the mass 9e as a self lifting anchor design which is described below.

The respective elements (support structure, uplift element, floating body, anchoring device etc.) are all interconnected in a serial manner along the vertical construction line. However, the sequence of respective connected elements of an installation may be altered. It is for example within the scope of the present invention to provide a power generating subsystem located inside the uplift floating body 2. It is within the scope of the present invention to provide any sequence of interconnected elements, modules or devices.

Another aspect of this design concept of providing a support structure through the centre of the floating body is that the floating body never can accidently be released from the support structure. The floating body can represent a hazard for shipping if it is accidently released for example during a storm at sea.

The floating body 3 has a centrally located through hole referenced as detail B in FIG. 1. Detail B comprising a motion constraining device or motion constraining arrangement 100 which is further illustrated in FIG. 1b. Movement up and down of the floating body 3 caused by ocean waves are transferred by cables 4, 4a from the floating body 3 to an upper system part (detail A illustrated in FIG. 1a) for production of electricity, wherein bidirectional linear motions of the floating body 3 (i.e. connected cables 4, 4a) are transformed into unidirectional circular rotations of an electric power generator 7, for example. For example, when the floating body 3 moves downwards cable 4 activate a rotation in the upper system part, while when the floating body 3 moves upwards cable 4a activates a rotation in the upper system part. However, it is within the scope of the present invention to use electric power generators that can convert bidirectional motion (rotation back and forth) of a shaft connected to the generator. It is also within the scope of the present invention to use linear generators.

During operation the floating body 3 will move up and down along the vertical direction of the support structure (for example columns 1a and 1b in FIG. 1). However, as readily understood, the shape of the waves will also provide a tilting of the floating body up and down. When tilted the bottom side of the floating body may be completely or partly in contact with the surface of the ocean, or if partly submerged, the whole of the floating body may be in contact with the water. However, the degree of tilting should be limited so the floating body will remain constrained inside functional limits of the operating parts of the design. As readily understood, different weather and wave conditions may also provide unwanted rotation of the floating body in the horizontal plane. Therefore it is necessary to control motion of the floating body in both the horizontal plane and vertical plane to avoid damage to the support structure and/or having motion of the floating body within functional limits of the design. Therefore, in examples of embodiments of the present invention there is a motion constraining device or motion constraining arrangement inside the through hole, guiding motion of the floating body in a plurality of directions relative to an axis of the support structure (i.e. the vertical central construction line). In addition, the motion constraining device or 100 also serves the purpose of attaching the floating body to the support structure. However, it is within the scope of the present invention to allow the floating body 3 to be able to turn around and face incoming waves in an optimal position for optimal transfer of energy from the waves to the floating body. It is within the scope of the present invention to allow a floating body to be able to rotate freely 360° degrees. The design of the floating body 3 provides self alignment towards incoming wave fronts. The free rotation makes it possible to avoid damage caused by external forces on the floating body.

In the example of embodiment illustrated in FIG. 1, two support structures 1*a* and 1*b* is used. The load on the support structure is dependent on how the position of the barycentre of the floating body 3 is located relative to the support structure. As known to a person skilled in the art the best solution to minimise the load on the support structure is to let the support structure pass through the barycentre. However, then there will be an increased load on a bearing providing a connection between the floating body and the support structure or column. Therefore it is within the scope of the present invention to provide two or more columns or support structures to pass through the through hole of the floating body, thereby dividing the load between them, and at the same time providing a motion constraining device 100 that allow all the load to be focused in the point of the barycentre of the floating body. The support structure elements or columns are arranged symmetrically around the vertical central construction line of the ocean wave power plant.

Figure 1B:
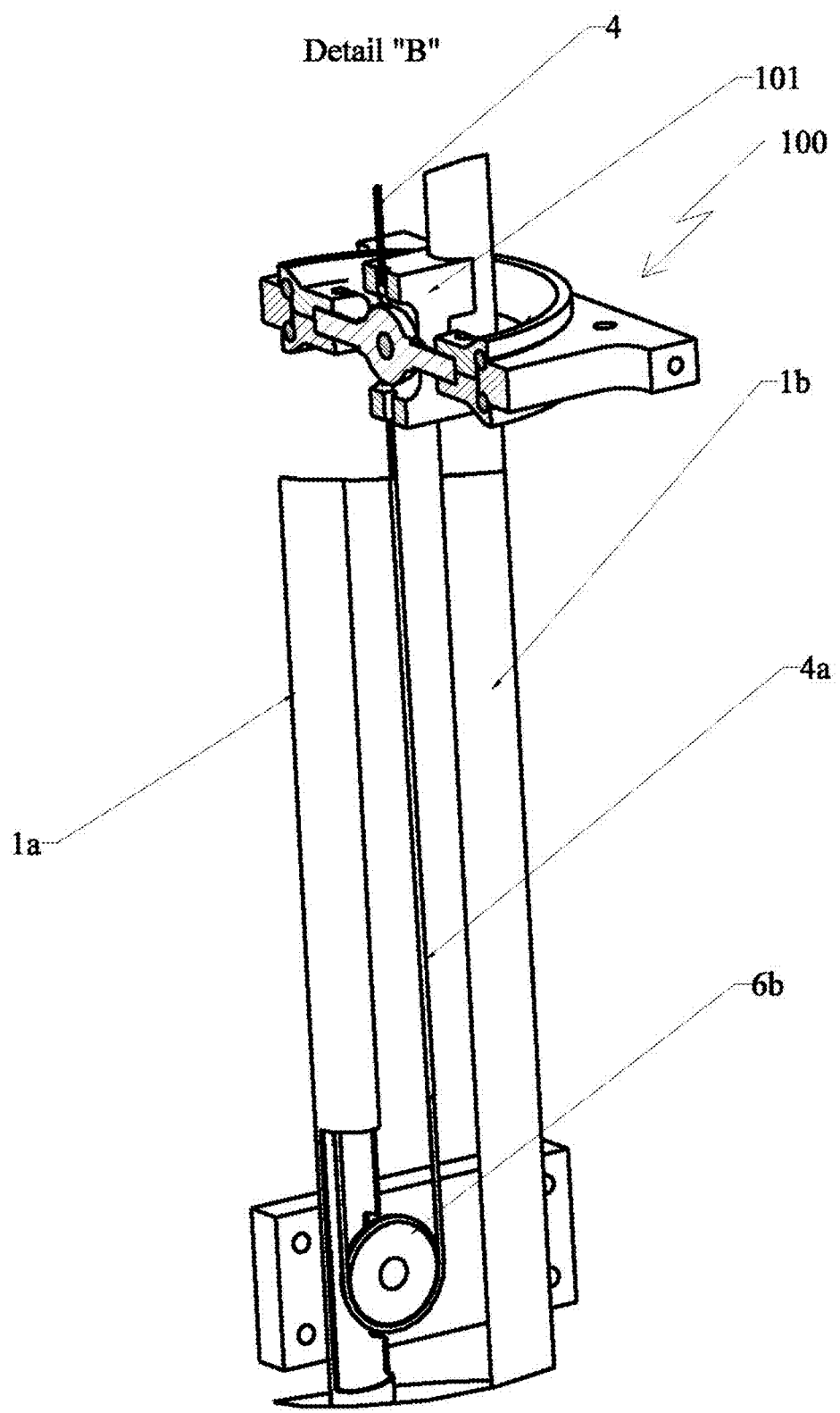
FIG. 1b illustrates a detail B of the embodiment illustrated in FIG. 1.

FIG. 1*b* illustrates an example of embodiment of a motion constraining device or arrangement 100 located in the centre of the floating body 3. Further, the figure illustrates the connection of a transmission member 4, 4*a* to the motion constraining device 100. As illustrated, a part of the transmission member 4, 4*a* that is connected to the motion constraining device 100 is located along the vertical central construction line or axis of the system. The motion constraining device 100 is providing free rotation of the floating body 3 in the horizontal plane via a bearing arranged in the outer circle of the motion constraining device towards the body of the floating body 3. In the centre of the motion constraining device 100 there is a ball joint (or a combination of two cylindrical joints as known to a person skilled in the art) with an axis going through the ball joint, wherein the axis is connected to the outer ring of the motion constraining device. This ball joint provides vertical tilting of an attached floating body. The transmission member 4, 4*a* is arranged to follow the central construction line or axis of the ocean power plant and is attached to the centre of the motion constraining device 100. In FIG. 1*b* transmission member 4*a* is attached to the bottom side in the centre position of the motion constraining device 100 while transmission member 4 is attached to the top side in the centre position of the motion constraining device 100. This is an important aspect since it is important that the floating body is oriented towards incoming waves in an optimal orientation. When the floating body is elongated the longer edge of the floating body will turn towards the wave front and will be oriented perpendicular to this direction. This solution provides self alignment of the floating body in the horizontal plane. Vertical tilting up or down of the floating body is limited by the size of the through hole in the centre of the floating body and/or the inclination of the sidewalls of the hole. However, the radius or size of the hole in the top surface of the floating body and/or the degree of inclination should be made large enough to avoid collision or contact between the support structure 1*a*, 1*b* and the body of the floating body during normal operational conditions of the ocean wave power plant. It is also possible to arrange dampers (for example a rubber ring) along the perimeter of the hole in the top surface of the floating body 3. Therefore, in this example of embodiment the inclination of the sidewalls of the through hole is part of the constraining device or constraining arrangement. The dampers may also be part of the motion constraining device or arrangement. The motion constraining device or constraining arrangement is further connected to the vertical oriented support structures. In FIG. 1*b* there is illustrated how support structure 1*b* is connected to the motion constraining device or motion constraining arrangement via a sliding connector 101. The sliding connector 101 is arranged along an axis perpendicular to the axis of the ball joint. Towards support structure 1*a* there is arranged a similar sliding connector 101. The area of the surface of the sliding connectors facing the surface of the support structures must be large enough to take up the forces from the floating body movements up and down and at the same time provide minimum friction. Use of materials like teflon, lubricants etc, may be applied on these surfaces to prolong the life time of these sliding connectors 101.

In an example of embodiment, the motion constraining device or motion constraining arrangement 100 is located in the through hole such that the location of the barycentre of the floating body 3 coincide with the center of mass of the motion constraining device.

It is within the scope of the present invention to provide a motion constraining device or motion constraining arrangement 100 providing support for respectively two, three, four or a plurality of columns (support structures). Preferably, columns or support structures are arranged symmetrically around the central vertical construction line.

The example of embodiment illustrated in FIG. 1 comprises a flexible transmission member 4, for example a wire, chain, rope etc. wherein a first end of the transmission member 4 is operatively connected to a power generating subsystem located on the supporting plate 8 (detail A). The flexible transmission member is guided inside column 1*a* in this example. At a location well below the supporting plate 8 on the support structure 1*a*, 1*b* it is arranged a supporting plate 9*a* comprising a pulley 6*b* (ref. FIG. 1*b*) receiving the flexible transmission member 4*a* from the supporting structure 1*a*, and after the pulley the flexible transmission member 4 is guided upwards towards the floating body 3. A second end of the flexible transmission member 4*a* is attached to a bottom side of the ball joint. On the top side of the ball joint the flexible transmission member 4 is attached, and is further guided upwards towards the power producing subsystem 7 located on the supporting plate 8, and is operatively connected to this system. When the floating body 3 moves up or down due to wave motions the flexible transmission member will move correspondingly upwards or downwards thereby activating the subsystem on the supporting plate 8 via each respective connected end of the flexible transmission member 4 the subsystem is operatively connected to.

Embodiments of the present invention may be deployed on suitable locations preferably providing steady wave conditions. Variable depth of water on respective deployment locations for example makes it necessary to adapt the design to the different conditions of the respective deployment locations.

With reference to FIG. 1, an anchoring of an example of embodiment of the present invention to the sea bed may be accomplished with a mass 9e, for example made from concrete that is heavy enough to keep the installation in place on this particular location. The system is connected to the mass 9e with for example via a chain 9d, for example attached to the mass 9e. The other end of the chain is connected to a single central point positioned directly below the barycentre of the floating body 3, provided for in the middle point of the plurality of support structures that are used in the specific embodiment (i.e. in the vertical central construction line). In FIG. 1, an elbow shaped bracket 9c is attached to the bottom ends of the respective supports 1a and 1b that provides the central fastening point for the chain attached to the mass 9e. If external forces acting on the structure of the installation in the sea are providing rotation of the installation, and subsequent rotation of the chain attached between the bracket 9c and the mass 9e, this will provide a shortening of the chain. The effect would be to drag the installation downwards. However, the uplift of the uplift floating body 2 will counter this action. The net result is that the installation will not rotate. As readily understood, if the chain is too long the length would provide a possibility that the installation could rotate around its own axis. If the location for deployment dictates a longer chain it is possible to avoid rotation by for example installing two or more chains that would restrict rotation.

The buoyancy provides stabilization. Therefore, the floating body will maintain its position relative to the support structure and will not be rotated out of its self aligned position towards the wave front. However, the whole structure can swing from side to side. This is important to allow mitigation of impact of the external forces on the structure. These forces will only provide swinging and no damage. The design of the example of embodiment of the motion constraining device, for example as depicted in FIG. 1b, allows tilting of the attached floating body 3. Therefore, the possible swing of the whole installation will not affect the floating body 3. The magnitude of the uplift force provided for by the uplift floating body 2 can be adjusted to limit the possible swinging from side to side of the installation. The higher uplift the less swing.

It is also important to understand that electric power generated by the generator in the system must deliver the power via an electric cable. The cable can be stretched for example inside one of the support structures, via the interior of the uplift body 2 (or on the outside) to the bottom of the uplift floating body 2. The cable can be wound in a coil, for example like a spiral, to provide extra length to compensate for tilting of the installation, and also to provide extra length to withstand some rotation of the installation.

Adaption of the height of the total installation with respect to a specific location on the sea bed may be accomplished by adjusting the length of the supporting structure, the height of the uplift floating body 2, the length of the chain or wire 9d etc. The positive uplift provided for by the uplift floating body 2 has to be of a magnitude large enough to provide a stabilisation of the installation. When the floating body 3 moves downwards when the amplitude of waves decreases, the uplift must be large enough to withstand these forces. The buoyancy of uplift floating body 2 takes up the forces and neutralizes dynamic impact on the floating body 3.

The weight 9e is resting on the sea/ocean bed and it must be heavy enough to avoid displacement along the seabed of the entire system during operation.

Figure 5:
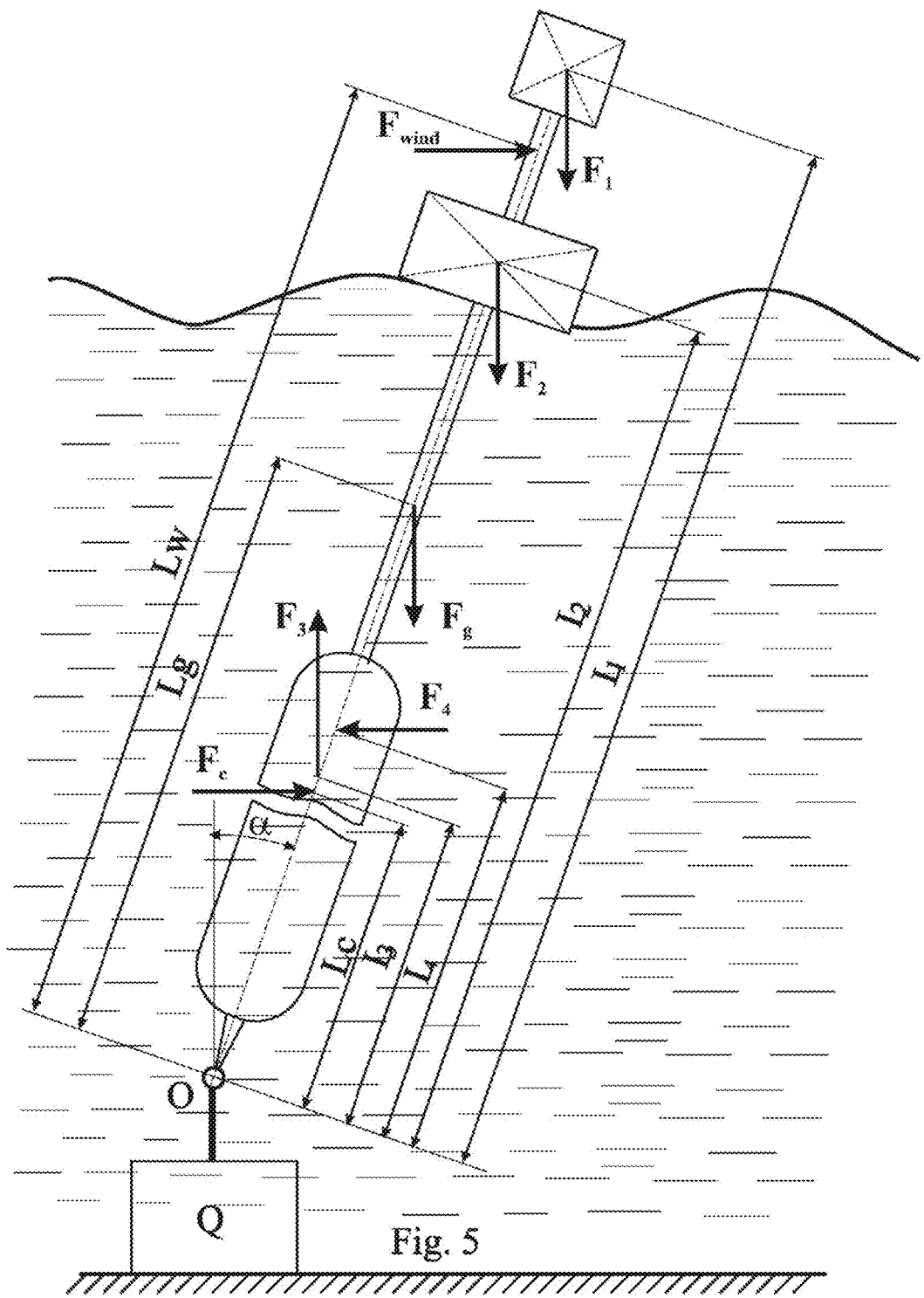
FIG. 5 illustrates uplift forces for an example of deployment of an example of embodiment of the present invention.

FIG. 5 illustrates schematically different forces acting on an ocean power plant according to the present invention when a system is deployed in the sea. An important parameter for the operation of the wave power plant is the size of the uplift or buoyancy of the submerged uplift floating body 2 (ref. FIG. 1). The necessary value of the uplift can for example be estimated by making an assumption about how many degrees of swing that should be allowed around point O in FIG. 5. For example, if it is decided that the swing or angle α in FIG. 5 must be within the interval ±10° the following definitions, assumptions and calculations can be done. With reference to FIG. 5 the following example is given for an angle α in the interval ±10°.

$F_1$ is the gravitational force acting on the platform 8 mass (ref. FIG. 1).

$F_2$ is the gravitational force acting on the floating body 3 mass (ref. FIG. 1).

$F_3$ is the uplift of the uplift floating body 2 (ref. FIG. 5) and is the value that should be estimated for an actual installation.

$F_4$ is the resistance force in water movements of the installation is subject to in the water.

$F_{wind}$ is the force of the wind pushing the installation sideways. In this example it is assumed that the direction of the wind is in the direction of the tilting of the installation, i.e. this force is adding to the tilting.

$F_c$ is the force from underwater currents on the location. As with the $F_{wind}$ parameter the direction of this force is such that it acts to tilt the installation.

$F_g$ is the gravitational force of the whole installation.

$L_1$ is the distance from the anchoring point O to the center of mass for the platform 8 (ref. FIG. 1).

$L_2$ is the distance from point O to the center of mass of the uplift floating body 2 (ref. FIG. 5).

$L_3$ is the distance from point O to the point of the uplift force for the uplift floating body 2. Since the uplift varies with depth in water and volume of the body, the equivalent acting point of this force is above the center of gravity of the uplift floating body 2, as known to a person skilled in the art.

$L_4$ is the distance from point O to the equivalent acting point of the resistance from the water when the installation moves in the water. The part of the support structure that is submerged must also be taken into account as known to a person skilled in the art.

$L_c$ is the distance from point O to the acting point of the force from underwater currents.

$L_g$ is the distance from point O to the center of mass of the installation.

$L_{wind}$ is the distance from point O to the equivalent acting point of the force from the wind.

$m_p$ is the mass of the platform 8 (ref. FIG. 5).

$M_s$ is the mass of the entire system without the weight of the generator on platform 8.

P is the electric effect produced in a generator on platform 8. In this example it is set to 120 Kw.

v is the efficiency of the wave power conversion. In this calculation it is assumed a standard mean value estimate from the literature about this efficiency and it is assumed to be 30%.

η is a safety parameterisation of 10%.

$$F_1 = m_g \cdot g = 6000 \text{Kg} \cdot 9{,}81 = 60 \text{kN} \quad 1)$$

$$F_2 = P/v \cdot g = 120 \text{Kw}/0{,}3 \cdot 9{,}81 = 40{,}77 \cdot 1{,}1 = 440 \text{kN} \quad 2)$$

To be able to provide a stabilisation of the system within the interval ±10° and at the same time provide enough uplift to withstand movements downwards of the floating body 3, the following two criterias has to be met:

I. The uplift force must be greater than the value estimated in equation 1). The doubling parameter 2 is a safety measure insuring proper functionality.

II. The uplift force must be equal or greater than the value estimated in equation 2).

The criterium I. is met if $$\text{Uplift force} > (F_1 + F_2 + m_s \cdot g) \cdot 2$$

Criterium II. is met if $$F_3 \cdot \sin \alpha \cdot L_3 > F_c \cdot Lc + F_2 \cdot \sin \alpha \cdot L_2 + F_1 \cdot \sin \alpha \cdot L_1 \pm F_4 + F_{wind} \cdot L\text{wind}$$

In this calculation the following forces are ignored:
1. Forces from waves hitting the floating body.
2. Forces from air resistance.
3. Friction forces in connection point "O".

The magnitudes of these forces are negligible compared with the other forces. By estimating the uplift force provided for by the uplift floating body 2 according to these calculations provided for above, the uplift is estimated with a security margin making it probable that an example of embodiment of the present invention in sea environment will be a stable installation.

Beside the forces that are acting on an installation as described above, the weight of the installation together with a total length of the support structure between the uplift floating body 2 and for example the subsystem A depicted in FIG. 1, may provide a bending of the support structure. This bending might cause structural damage or be in conflict with the movement up and down of the floating body 3 and/or the transmission member 4, 4a. When there is a movement back and forth, for example within ±10°, of the support structure the weight of the support structure provides an arm with a momentum that tends to bend the structure. It is possible to arrange a loop with a wire via protruding arms from the top to the bottom. The tension in the loop provided for by for example a wire will straiten up the support structure or hold it back from falling downwards (bending the structure). The loop is fastened to the structure high up and is then guided via pulleys down to a fastening point arranged on the mass 9e anchoring the installation to the sea bed. The rectangle shape provided for by the wired loop is equivalent to a stiff body. It is within the scope of the present invention to provide a similar additional attached loop in a plane perpendicular to the plain provided for by the other loop. In another example of embodiment it is possible to guide the stiffening wire inside one of the support members (columns). Further. It is also possible to attach protruding members (arms) to the support structure in a suitable distance from the top and then connect wires from the protruding members up to a top point of the support structure thereby forming a triangle shaped element.

FIG. 1a depicts detail A in FIG. 1. In an example of configuration of an installation according to the present invention, when the floating body 3 moves toward the bottom of the sea the movement of the floating body 3 pulls transmission member 4 downwards, which then rotates the pulley 5b that through freewheel device 52 (ref. FIG. 1d) rotates shaft 7a, and torque is transmitted to the generator 7 which then produces electricity, for example. Since the transmission member 4, 4a are interlinked since they are connected to the floating body 3 and passes the pulley 6b located at the bottom end of the support structure, movements downwards of the floating body 3 provides also pulling of the transmission member 4. Transmission member 4 is attached to pulley 5b but since one way clutch 52 (ref. FIG. 1c) is active and one way clutch 51 is inactive in this direction of movement no conflicting actions on the common shaft 7a will appear.

Figure 1C:
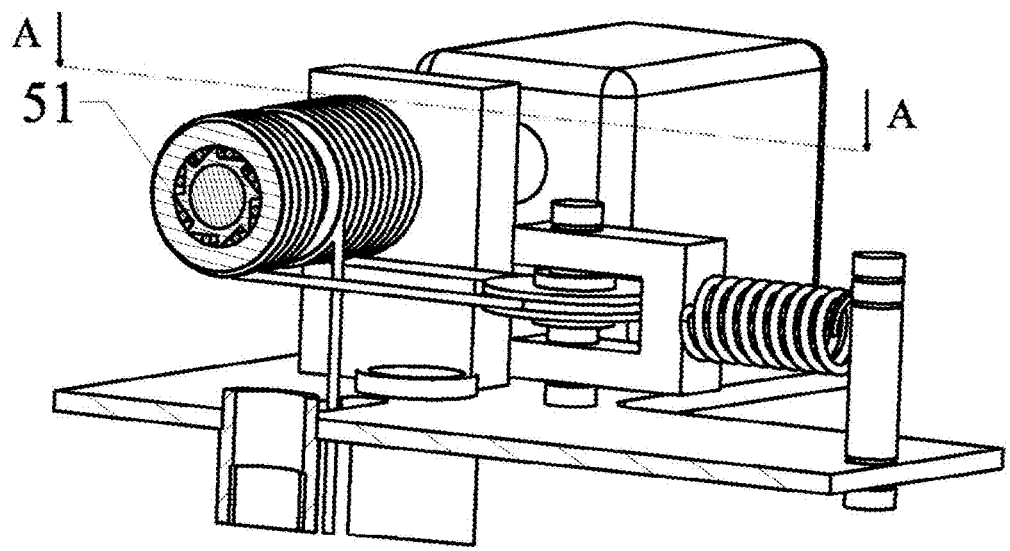
FIG. 1c illustrates another detail of the embodiment illustrated in FIG. 1
Figure 1D:
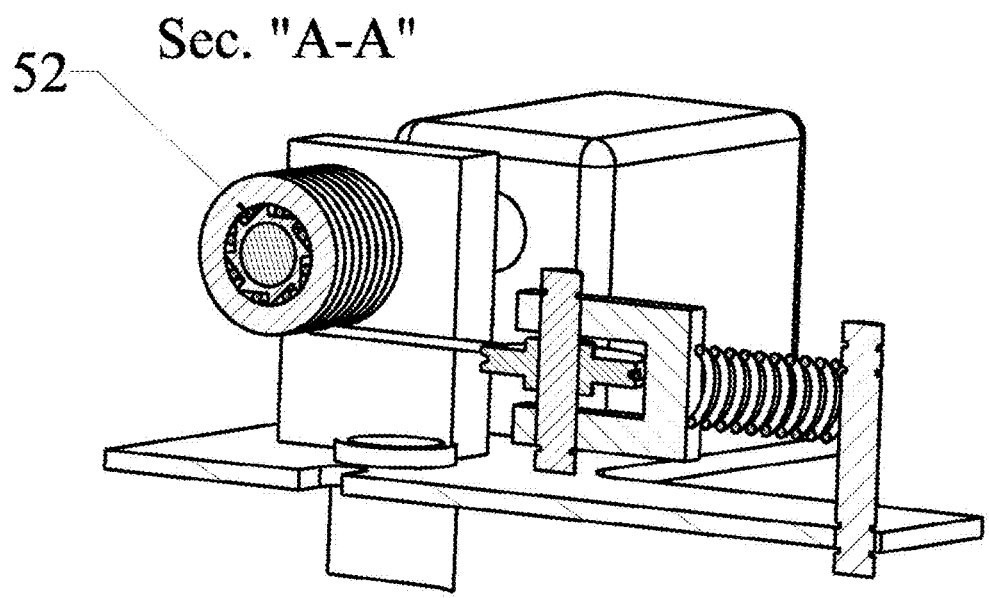
FIG. 1d illustrates another further detail of the embodiment illustrated in FIG. 1.

When the floating body 3 moves upwards from the bottom of the sea the movement of the floating body 3 pulls transmission member 4a upwards, which then rotates the pulley 5a that through freewheel device 51 (ref. FIG. 1c) rotates shaft 7a, and torque is transmitted to the generator 7 which then produces electricity, for example. Since the transmission member 4, 4a are interlinked since they are connected to the floating body 3 and passes the pulley 6b located at the bottom end of the support structure, movements upwards of the floating body 3 provides also pulling upwards of the transmission member 4. Transmission member 4 is attached to pulley 5b as described above but since one way clutch 52 (ref. FIG. 1d) is inactive in this direction of movement no conflicting actions on the common shaft 7a will appear. It is important to notice how the transmission member 4, 4a engage the respective pulleys 5a, 5b, i.e. if the transmission member engage the pulley on a front side or back side.

In an example of embodiment the power generating subsystem A comprises a bidirectional to unidirectional conversion mechanism driving a shaft 7a of an electric generator 7, wherein the shaft 7a comprises a first pulley 5a wound with the transmission member 4a being guided and coming from the support structure 1a and being engaged to the pulley 5a on a front side of the pulley 5a, the pulley 5a comprises a first freewheel device 51 connected to the shaft 7a, the transmission member is further guided out from the pulley 5a from a back side of the pulley 5a towards and wound around a pulley 6a supported by a supporting arm 12 providing tension of the transmission member 4, 4a, the transmission member 4 is further guided towards a second pulley 5b comprising a second freewheel device 52 connected to the shaft 7a, the transmission member 4 is being engaged to the pulley 5b on a back side of the pulley 5b before the transmission member 4 is guided out of the pulley 5b from a front side of the pulley 5b, wherein the transmission member 4 is further guided towards the floating body 3 along the axis of the ocean wave power plant.

In another example of embodiment, the pulley 6a is made smaller than the other pulleys as illustrated in FIG. 1a. The section of the transmission member 4, 4a that is engaged by the pulley 6a might also be made thinner in diameter than the rest of the transmission member 4, 4a since the heavy loads on the transmission member will be taken up by the part of the transmission member 4, 4a that is respectively wound on respective pulleys 4a, 4b. The thinner section of the part of the transmission member that provides tension in the transmission member can then be easier to install, for example.

The respective movement upwards and downwards of the transmission member 4, 4a will provide a huge variation in the tension of the transmission member 4, 4a. During operation it is important to keep enough tension in the flexible transmission member to keep the transmission member in operational contact with the respective pulleys, for example. Therefore, a support 12 supporting pulley 6a is arranged in the loop of the flexible transmission member 4, 4a, wherein the transmission member 4, 4a is wound around the pulley 6a. One end of the support 12 is attached to the support structure of the installation via a damping spring 13 that provides sufficient tension of the transmission member 4, 4a during operation. Instead of a spring 13 it is possible to attach a weight load. It is within the scope of the present invention to provide instrumentation that measures tension in the transmission member. A regulator may be attached that regulates the tension to be on a predefined level during all different operational conditions. A piezo crystal based device, for example attached to the transmission member (on a surface or embedded within the member) may transmit measurements via the transmission member (wire) to a micro controller based device that may be programmed to pull or release the transmission member via a pneumatic arm for example on a location similar to the damping spring 13.

Figure 2:
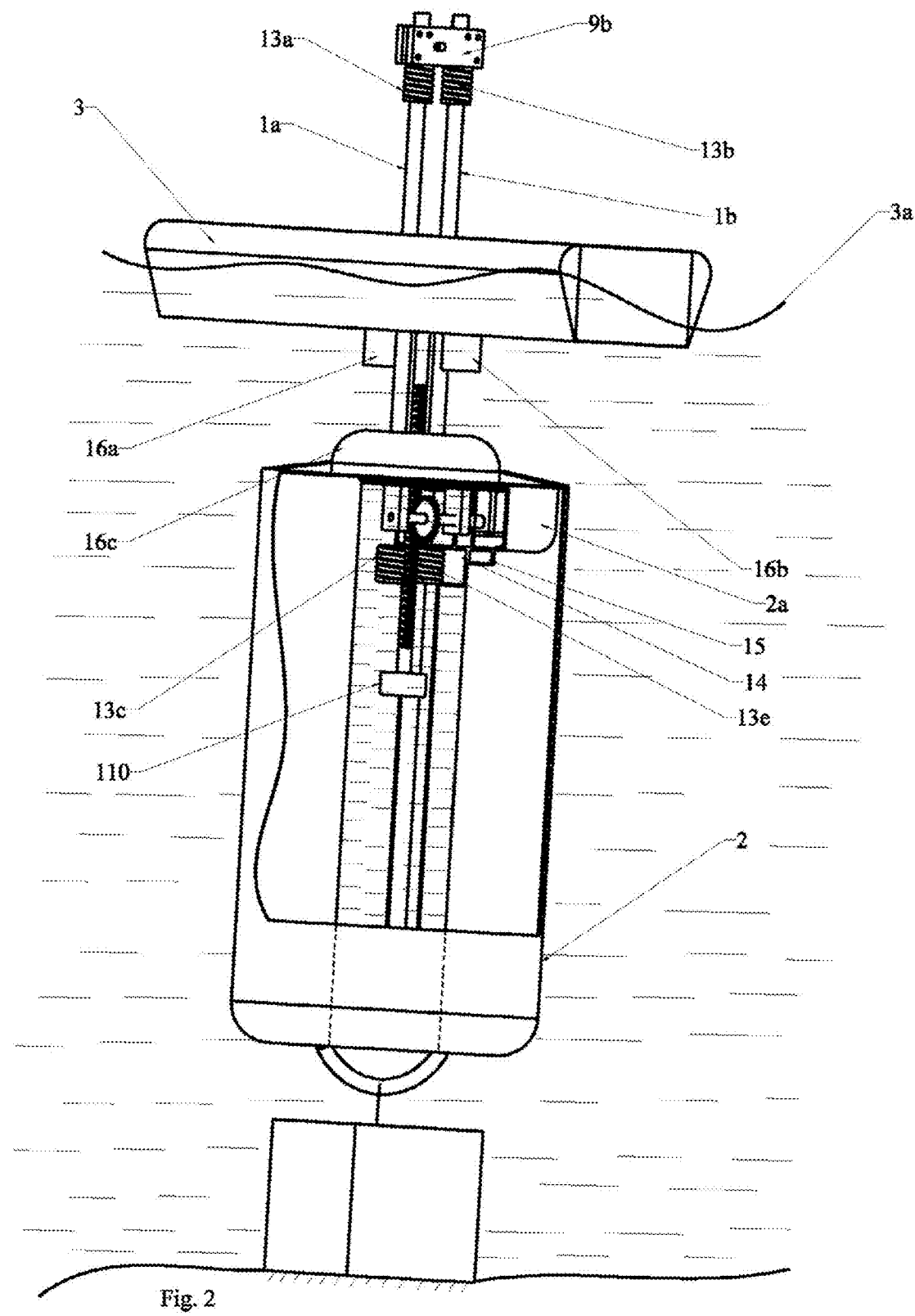
FIG. 2 illustrates another example of embodiment of the present invention.

Another important aspect of the example of embodiment depicted in FIG. 1a is that it is possible to arrange a braking system on the common shaft 7a. This braking mechanism may be used to retard movements of the floating body 3 up or down along the support structure. In the event of very high amplitudes of incoming waves, there is a risk that the floating body can hit the support platform 8. It is possible to arrange mechanical dampers 13b as depicted in FIG. 2, or electrical sensory systems may detect the high waves and then activates the braking. For example, it is possible to arrange a switch on one of the support structures in an appropriate distance below the supporting plate 8, and when the switch is activated by a passing motion of the floating body 3, the braking action starts. It is important to provide a soft retardation and stopping action to mitigate transfer of moment of force from the floating body to the installation.

FIGS. 1c and 1d illustrates the mutual position of two freewheel devices 51 and 52. FIGS. 1c and 1d clearly depicts that the clutches 51 and 52 are oriented in the same activation direction, i.e. the teeth are oriented in the same direction. This way of setting is very important because the transmission member is wound in opposite directions on the respective drums 5a and 5b. During operation, when freewheel device 51 is moved in the activation direction then freewheel device 52 is in a freewheeling state. When freewheel device 52 is active then freewheel device 51 is in a freewheeling state. This arrangement makes it possible to use a same shaft 7a that is activated to rotate in a same direction regardless of the direction up or down of the floating body 3. This arrangement is clearly a significant simplification of known systems in the prior art. This simplification not only provides a much less loss of energy in the power production chain, but provides also a much easier maintenance scenario. The very low number of parts in this solution makes it probable that this assembly will provide a stable working condition for the system. Further, the very low number of parts makes it probable that this subsystem will function well also with waves with low amplitudes. Another advantage of using a flexible transmission member in an arrangement as disclosed herein is that sometimes the length of the structure of the ocean wave power plan must be adapted to conditions at the intended location for deployment. Such an adjustment of length could be provided for example with inserting or removing sections of the support structure. However, then the flexible transmission member needs also to be adjusted. The pulleys 5a, 5b may comprise additional length of the flexible transmission member that can easily be pulled out from the pulleys to compensate for the extra length, or the flexible transmission member can be wound up on the pulleys when the support structure needs to be shortened. The position of support 12 in FIG. 1a relative to the position of the pulleys 5a and 5b may be adjusted to provide the correct tension for the flexible transmission member.

The arrangement of a subsystem as depicted in FIGS. 1a, 1c and 1d according to the present invention is providing an optimal transfer of bidirectional motion to unidirectional rotation of a shaft connected to an electric generator. This optimized transfer of motion provides also an optimized transfer of torque at the input shaft of the generator, thereby providing an optimized take out of energy from waves. The rotational speed of the generator can be adapted by a multiplier attached on the input side of the generator shaft. The diameter of the pulleys 5a, 5b can also be adapted to adapt the rotational speed of the design. As known to a person skilled in the art it is advantageous to have a minimum diameter of the pulley to be 40 times the diameter of the wire to minimize wear and tear of the wire.

FIG. 2 illustrates another example of embodiment of a system according to the present invention. The principle of having a supporting structure passing through a centrally positioned hole in the floating body is used in this example of embodiment as in the example of embodiment depicted in FIG. 1. The main difference is that the power generating subsystem is located inside a submerged floating body like the uplift floating body 2 in FIG. 1. In FIG. 2 the power generating subsystem A is located inside an internal cylinder inside the uplift floating body 2. The floating body 3 depicted in FIG. 1 can be of the same design as in the example described above. This embodiment may use a flexible transmission member (wire, rope etc.) or a fixed inflexible transmission member. The example depicted in FIG. 2 illustrates an example of embodiment comprising a rigid transmission member engaging the motion conversion mechanism inside the submerged floating body with a rack and pinion gear. As detailed below, this design also comprises a significant reduction of complexity in the conversion chain of bidirectional movement to unidirectional movement of a shaft rotating an electric generator. FIG. 4a illustrates an example of simplification of a rack and pinion gear unidirectional driven electric generator.

The design as depicted in FIG. 2 provides an optimized protection of the power generating subsystem of the installation. The distance between the submerged floating body providing uplift of the construction in seawater can be made sufficient large enough such that there never will be any contact between this uplift floating body 2 and the floating body 3 on the surface of the water, even when waves have huge amplitudes. However, bumpers like bumper 13a and 13b can be installed on each respective support structure 1a and 1b at the top end just below the connection plate 9b. Further, rubber members can also be introduces to strengthen the protection.

If an example of embodiment makes the top of the underwater floating body being closer to the ocean surface and there is a possibility of hitting the floating body 3, then a damper 16c may be attached to the top of the underwater uplift floating body 2. Damper 16c may be made of rubber, pneumatic, tracks, hydraulic, etc. In addition it is possible to attach reinforcement or damper 16a and 16b to the floating body in order to further mitigate the collision of the floating body and the underwater floating body. As an additional security aspect, to prevent the floating body from hitting the end connection 9b of columns 1a and 1b, a stopper 110 may be added to the rack 18. The stopper 110 is located to provide a first contact with one or more springs i.e. damper 13c, and thus prevent contact between the floating body 3 and the end connection 9b.

Figure 2A:
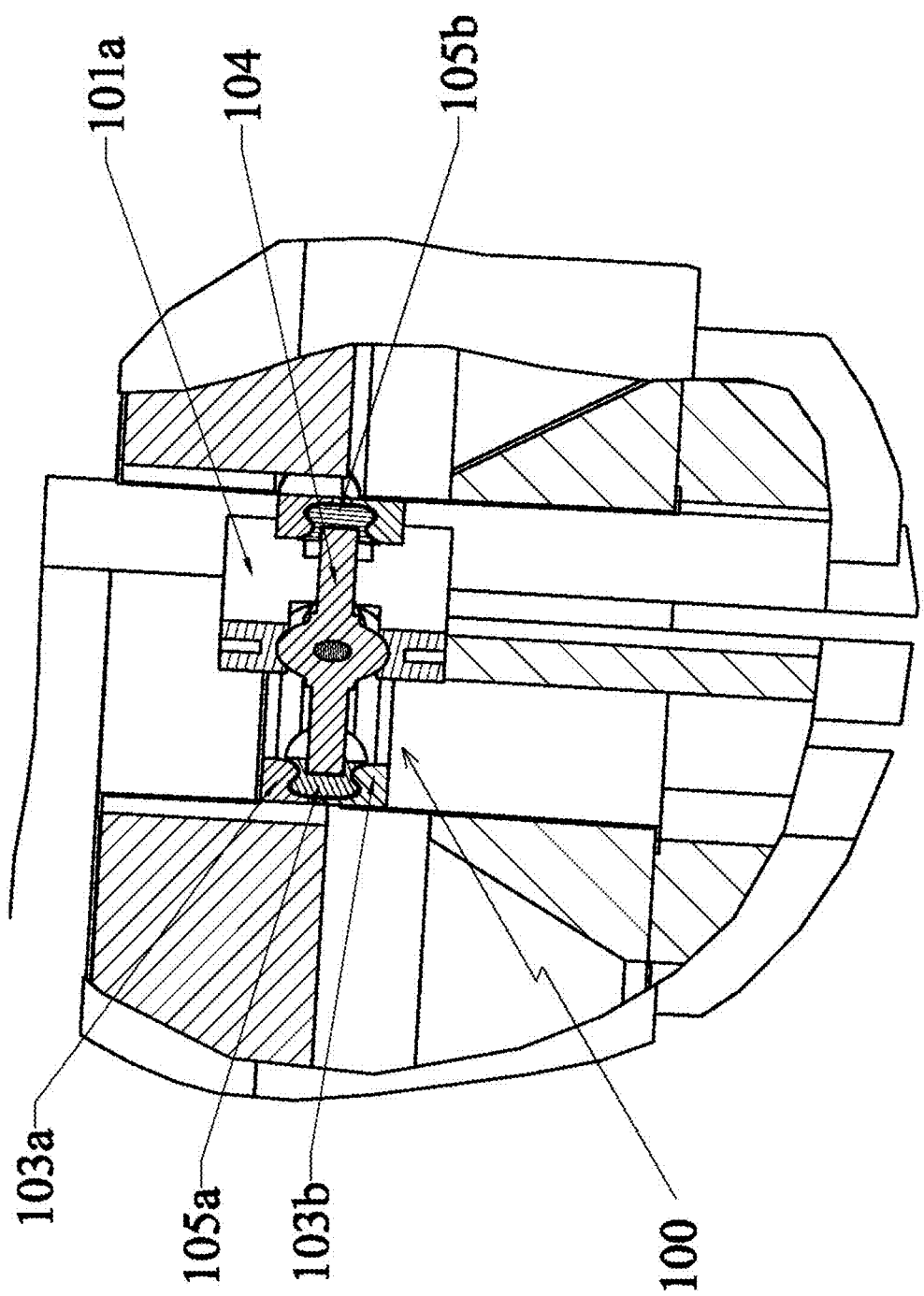
FIG. 2a illustrates a detail of the embodiment illustrated in FIG. 2.

In the example of embodiment of the present invention comprising a rigid transmission member, the motion constraining device located in the central through hole of the floating body 3 can be embodied as exemplified in FIG. 2*a*. The shaft 104 has two respective rollers attached to its respective ends; the roller 105*a* and 105*b* makes it possible for the floating body 3 to turn around the axis defined by circular motion of the rollers inside the circular rings 103*a* and 103*b*. The circular rings are attached firmly to the body of the floating body 3. The rigid transmission member is attached to the centre of the through hole in between the support structure 1*a*, 1*b*.

With reference to FIG. 2*a*, the shaft 104 is connected to slide 101*a* by a joint linkage. The slide 101 is located between the support structures 1*a* and 1*b* which provide vertical motion of the floating body along the direction of the support structure 1*a*, 1*b*.

Figure 2B:
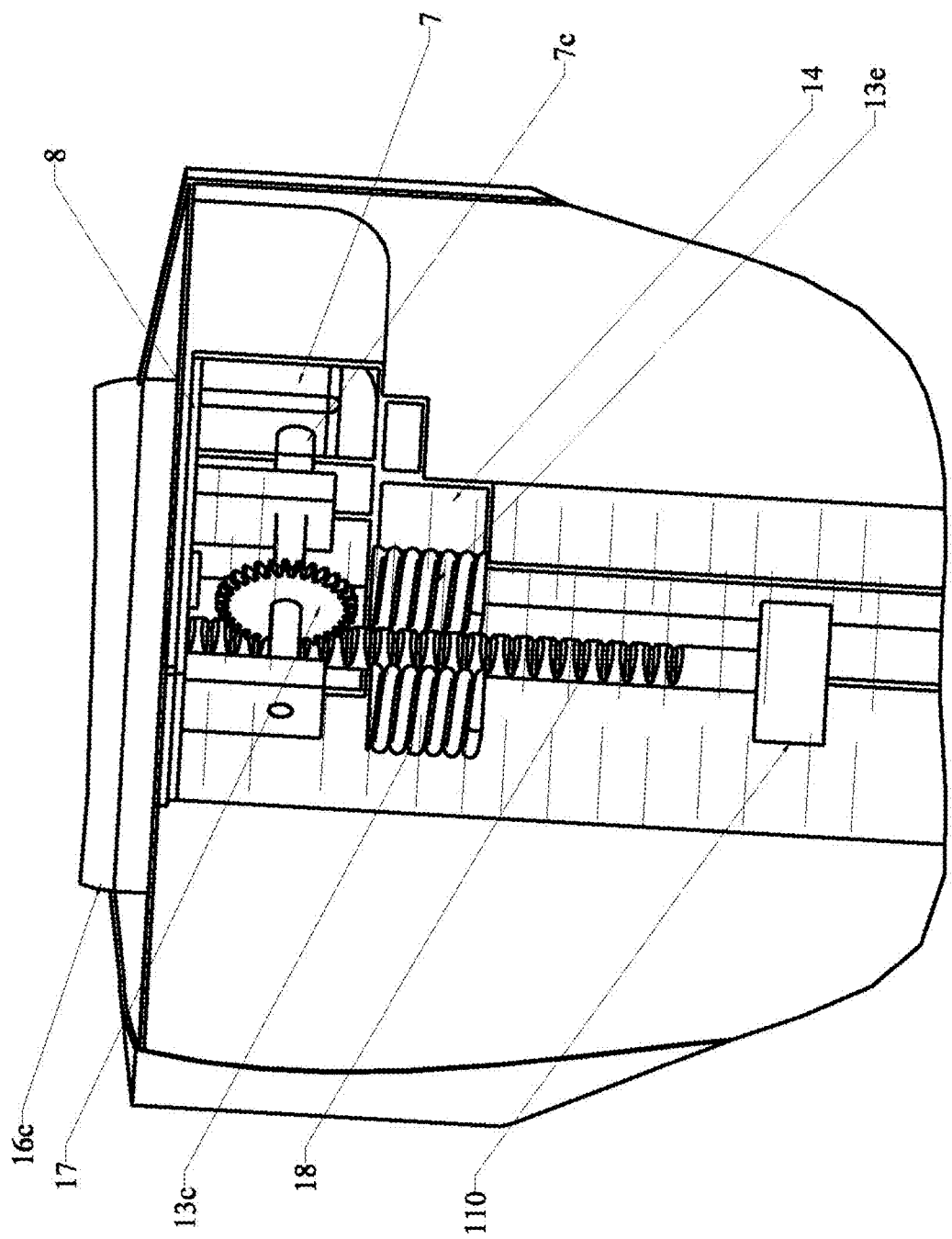
FIG. 2b illustrates another detail of the embodiment illustrated in FIG. 2

FIG. 2*b* depicts a cross-section of the system for electricity production, positioned in the underwater body 2. There is water in the central part of the underwater uplift floating body 2 where the rigid transmission member passes through. The motion of the floating body causes the rigid transmission member to move, too. The rigid transmission member transmits its linear motion to gear 17, and the gear 17, by means of the shaft 7*c*, transmits it further to the bidirectional to unidirectional motion converter and further to the generator 7, the generator 7 may have a multiplier attached to its input shaft.

Since this device is positioned under the water surface, it is necessary to ensure that the area around the shaft 7*c* is hermetically sealed to prevent water to reach the area with the generator.

This can be achieved in several ways known to a person skilled in the art. For example, in FIG. 2*b* there is arranged a cavity 14 that can collect water that passes through the bearing 7*c*. This water may be ejected from the cavity 14 with the help of a pump or by excess pressure.

In order to avoid unwanted or damaging contact between the floating bodies 3, a stopper 110, firmly coupled to the rack 18, is added. With extremely large waves the rack is pulled out to the point where the stopper 110 hits dampers 13*c* and 13*e*.

The rigid transmission system can be placed below the floating body inside the underwater body, or over the floating body such as in the described embodiment with a flexible transmitter. Similarly, the system for producing electricity with flexible transmitter can be placed below the floating body inside the underwater body.

FIG. 3 illustrates an example of embodiment of a floating body 3. The through hole 35 comprises the motion constraining device or motion constraining arrangement, for example as depicted in FIG. 1*b*, and provides free passage for the support structure 1*a*, 1*b*. The joint linkage described above provides a connection between the body of the floating body 3 and the respective support structures 1*a*, 1*b*.

FIG. 3*a* depicts a cross-section of the floating body 3 depicted in FIG. 3. As illustrated there is at least a ssecond cavity 36 that is filled with water. This added weight provided for by this water provides a higher torque at the input shaft of the generator as described above when the floating body is lowered by wave motions. The floating body is partly submerged to the waterline 3*b*. The trapped water between the lines 3*a* and 3*b* provides the additional mass. The added force provided for by this mass is proportional to the actual mass of this trapped water.

When the floating body is moved upwards by wave motions it is the buoyancy of the floating body that provides the weight. This is equivalent to the mass between the lines 3*a* and 3*c* minus the actual weight of the floating body 3 between the lines 3*a* and 3*c*. Therefore it is of outmost importance that the weight of the floating body 3 between the lines 3*a* and 3*c* is as light as possible.

The at least ssecond cavity 36 is filled initially when the operation of the power plant starts. The openings 3*h* and 3*f* can fill the at least ssecond cavity 36 when the vents 31 and 32 are open to let trapped air in the cavity be vented. The vents 31 and 32 are one-way vents being closed from the top side into the cavity 36 to avoid air to enter the cavity from above. An important aspect of this design of the floating body 3 is the position of the openings 3*h* and 3*f*. During operation the floating body 3 may tilt up and down sideways because of waves. This tilting is constrained by the inclination of the sidewalls of the through hole in the centre of the floating body 3. However, wave conditions can be very variable and sometimes it is possible that the tilting of the floating body 3 may leave the bottom side 34 exposed to the free air.

If the openings 3*h* and 3*f* had been positioned close to the outer perimeter of the floating body the openings would probably be exposed also to the free air. This would then provide an opening the trapped water inside the cavity 36 could stream through. By locating the openings close to the centre of the floating body the probability that the openings 3*h*, 3*f* could be exposed to the free air would be close to zero.

However, some times it can be beneficial to empty a part of the cavity 36 with water due to problems related to the phenomena called slamming described in detail further below. In FIGS. 14*a*, 14*b* and 14*c* there is depicted another example of embodiment of the floating body comprising a plurality of the at least second cavity 36 wherein the bottom part of the cavity 36 is open. However, since there is a plurality of chambers, the loss of weight due to loss of water from some of the cavities 36 provides no significant reduction in the weight of the floating body due to the remaining water inside the other chambers 36 still being trapped inside the water.

In an example of embodiment of the present invention, the buoyancy centre of the floating body 3 is coinciding with the centre of mass of the motion constraining device arranged in the through hole 35.

The shape and size of the floating body is directly connected to how effectively the floating body will be moved up and down by waves. For example, short wavelengths are very effectively utilized by long elongated floating bodies while waves with long wavelengths are utilized very effectively by round shaped bodies as known to a person skilled in the art. It is within the scope of the present invention to utilize any shape and/or size of a floating body. It is further within the scope of the present invention to provide farms with a plurality of embodiments of the present invention comprising differently shaped floating body elements, for example a round shaped body, to be able to maximize transfer of energy from incoming waves of different shapes and wavelengths. However, common for all embodiments of a floating body used according to the present invention, is that they comprises a cavity that can be filled with water during operation.

The elongated shape of the floating body 3 as depicted in FIG. 3 is only an example of an elongated shape that can be used according to the present invention. The important aspect is that it is possible to fill a cavity in the floating body with water and that tilting etc. of the body during operation does not empty water. It is further important to balance weight and buoyancy of the body such that movements up respectively down provides enough torque on an input shaft of a generator. It is also within the scope of the present invention to use round shaped bodies for the floating body 3. Any shape that can be adapted to transfer wave energy more efficient is within the scope of the present invention.

Another aspect of the present invention with respect to the self alignment of the floating body 3 is to arrange at least one propeller system underneath on the bottom surface close to an edge of the floating body 3. By measuring wave conditions and wave direction of incoming waves it is possible actively to rotate the floating body around the axis of the ocean wave power plant thereby ensuring that the floating body is stabilized in a position facing the wave front in an optimized energy transfer position.

Figure 4:
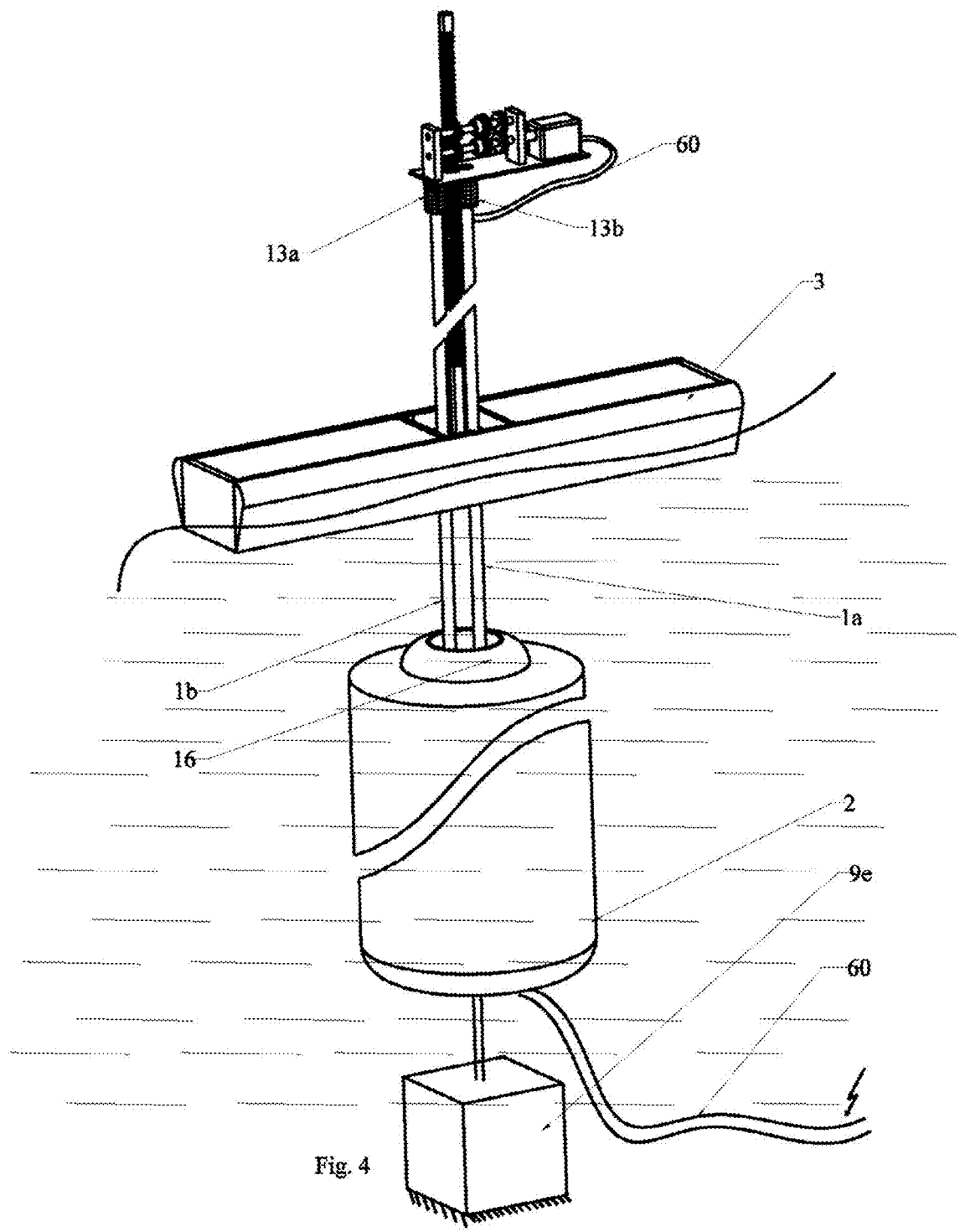
FIG. 4 illustrates another example of embodiment of the present invention.
Figure 4A:
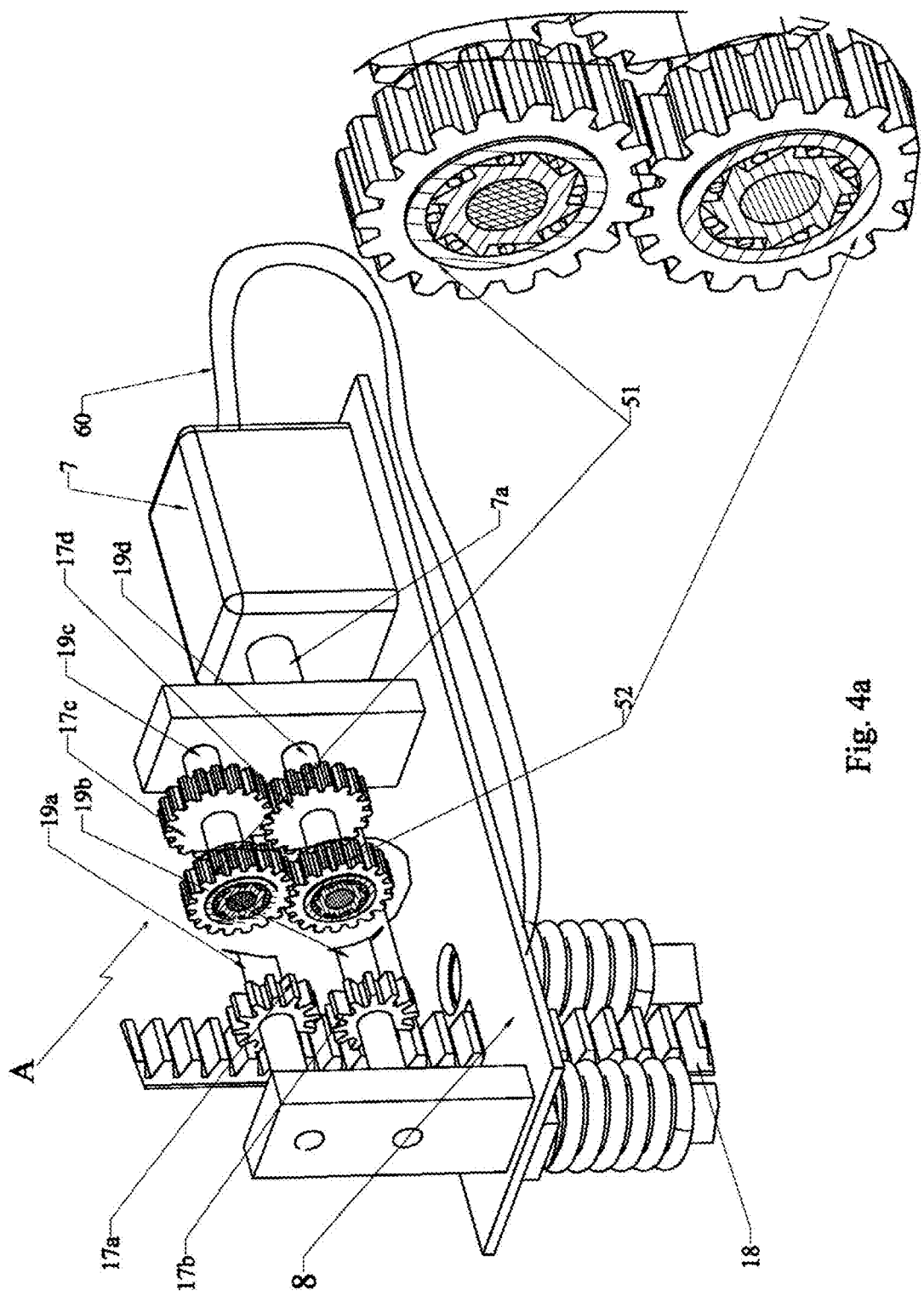
FIG. 4a illustrates an example of embodiment of the present invention comprising a motion translation mechanism according to the present invention.
Figure 4B:
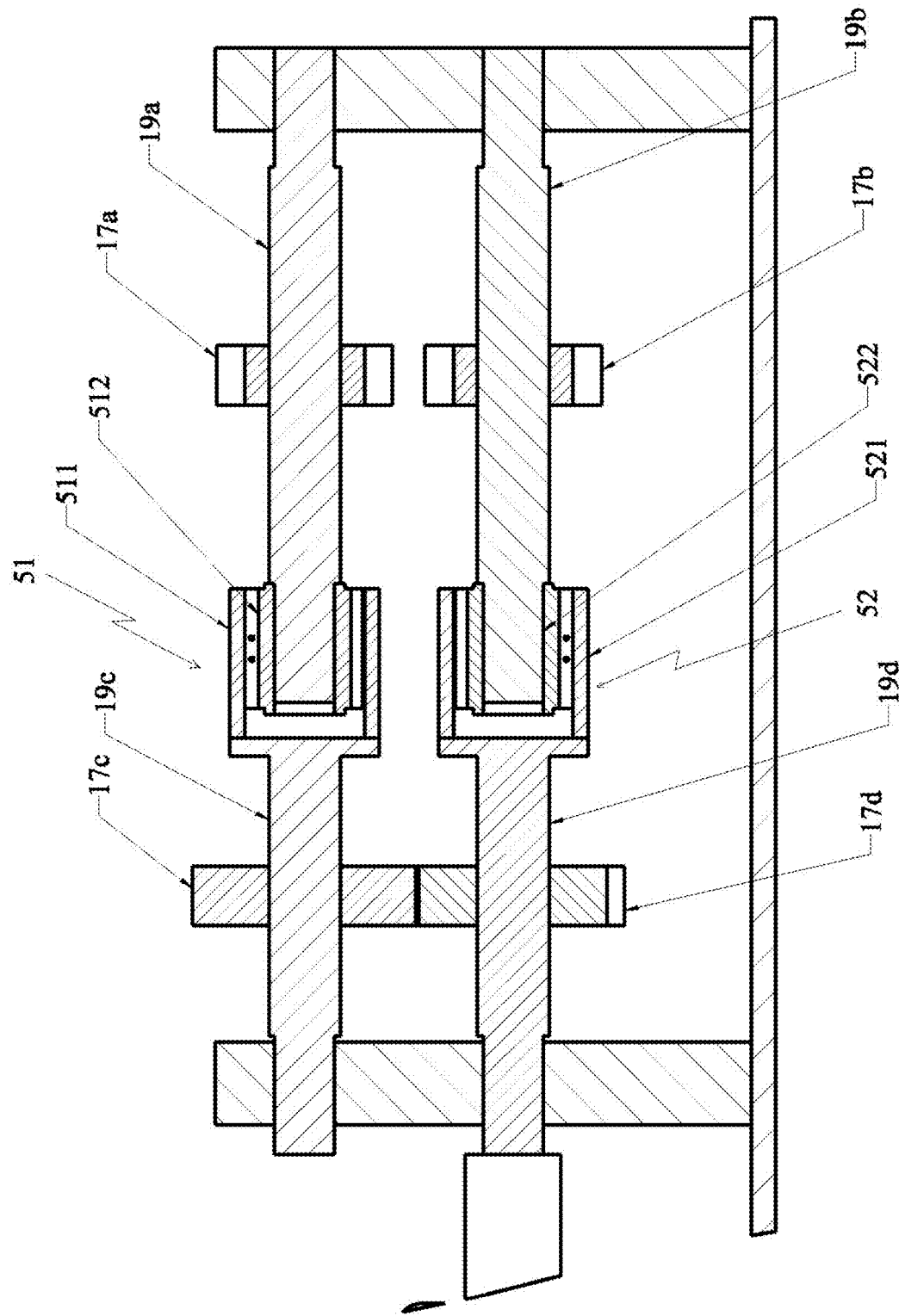
Figure 4C:
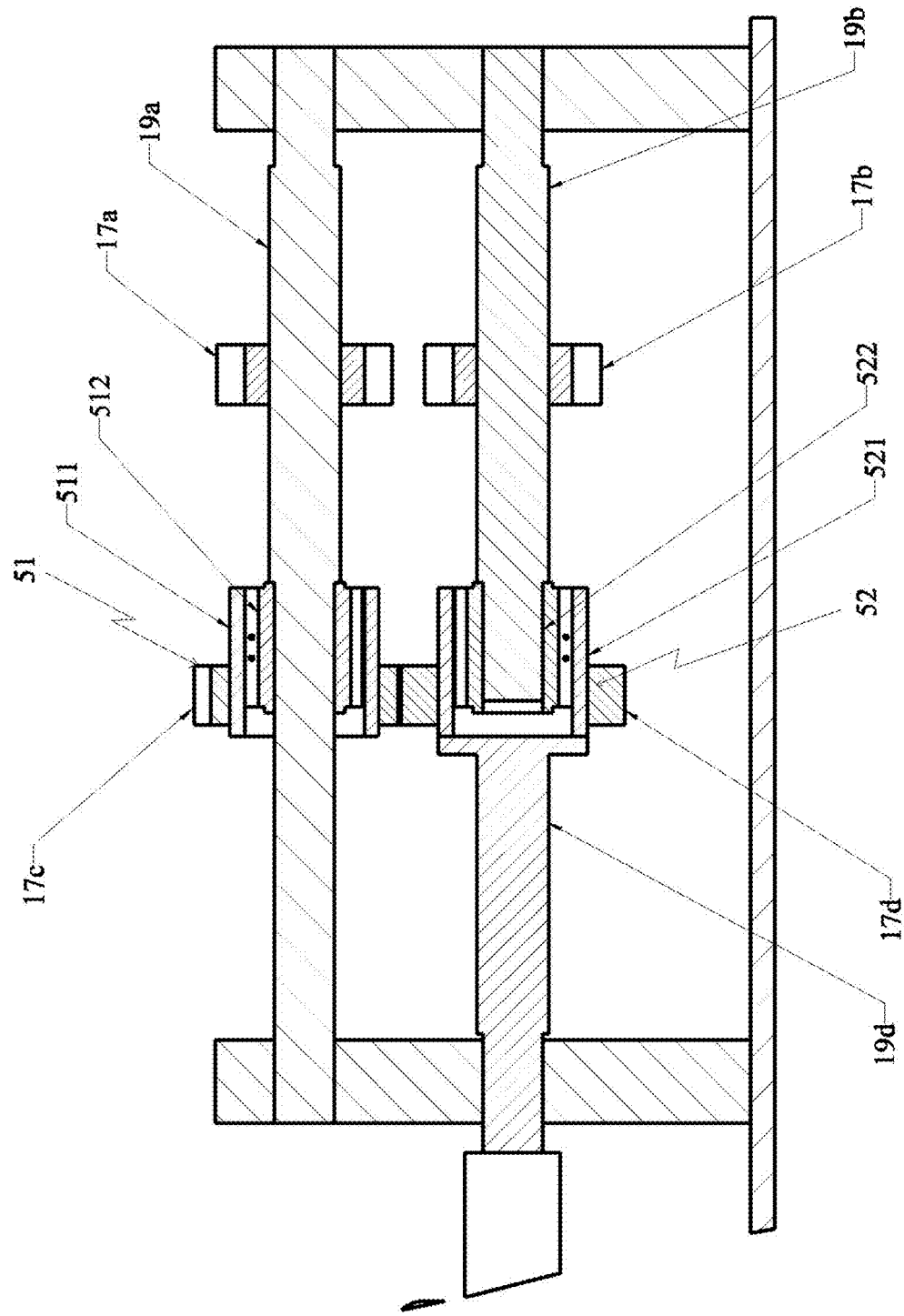

The FIGS. 4, 4a and 4b illustrate an example of embodiment wherein the power producing subsystem A is located above water. The system comprises two supporting columns 1a and 1b, that are at one end attached to the underwater uplift floating body 2 which is located below the water surface in the zone where there is no influence of water motion (still water); weight 9e is attached to the underwater floating body at the other end by means of ropes, chains, cables, etc. and is located on the sea bed. A damper 16 is attached to the underwater uplift floating body 2. The floating body comprises a motion constraining device as depicted and explained with reference to FIG. 2a. A gear rack 18 is inflexibly coupled to the slider 101 at one end and another second end of the gear rack 18 is connected to input gears 17a and 17b of the mechanism for converting bidirectional motion to unidirectional motion. FIG. 4a and FIG. 4b depict this mechanism. Gears 17a and 17b are firmly connected to shafts 19a and 19b, respectively, one end of the shafts 19a and 19b is connected to the support structure in a rotatable holder. The other end of shafts 19a and 19b is firmly coupled to the centre part (casing) of freewheel devices 51 and 52, the edges of the freewheel devices 51 and 52 are firmly coupled to shafts 19c and 19d. Gear 17c is placed on the shaft 19c; gear 17c and 17d are coupled gears; gear 17d is firmly coupled to the shaft 19d, shaft 19d is firmly connected to the input shaft of the generator 7. The entire mechanism for the transformation of movement and the power generator 7 are mounted on the supporting plate 8 that is firmly attached to one end of the supporting columns 1a and 1b.

The example of embodiment depicted in FIGS. 4, 4a and 4b generates electricity from the aquatic (sea/ocean) waves motion in the following way: while the wave is approaching, the floating body begins to move under its influence, when the floating body moves upwards, the gear rack moves gears 17a and 17b, which over shafts 19a and 19b transmit torque further to clutches 51 and 52. Depending on whether the floating body 3 moves up or down, freewheel devices alternately turn on (when the floating body moves up, clutch 51 turns on, and when it moves down, clutch 52 turns on), and they transmit torque to gears 17c and 17d through the shafts 19c and 19d; as the gears 17c and 17d are mutually connected, direction of rotation changes in case when the torque is transmitted through clutch 51 ensuring that generator shaft 7 always rotate in the same direction and thus generate electricity when the rack 18 moves upwards or downwards.

With reference to FIG. 4a, in an example of embodiment the transmission member 18 comprises a rack and pinion gear, the power generating subsystem A comprises a bidirectional to unidirectional conversion mechanism driving a shaft 7a of an electric generator 7, wherein the rack and pinion gear comprises two above each other located gears 17a, 17b being simultaneously engaged by the rack 18, wherein gear 17a is connected via a shaft 19a to a first freewheel device 51 engaging a gear 17c on shaft 19c wherein the gear 17c is engaging a gear 17d on shaft 19d being in one end connected to the shaft 7a of the electric power generator 7 and in another end being connected to freewheel device (52) on a shaft (19b), wherein the freewheel device 52 is connected via shaft 19b to the gear 17b being engaged by the rack 18, the freewheel device 51 and the freewheel device 52 is made to be engaged one at a time respectively when the rack 18 moves upwards and when the rack 18 moves downwards.

In order to simplify the construction, gears 17c and 17d may be inflexibly coupled to the rim of respective freewheel devices 51 and 52. Then the construction can be made with one continuous shaft on both sides of the respective freewheel devices.

Figure 4D:
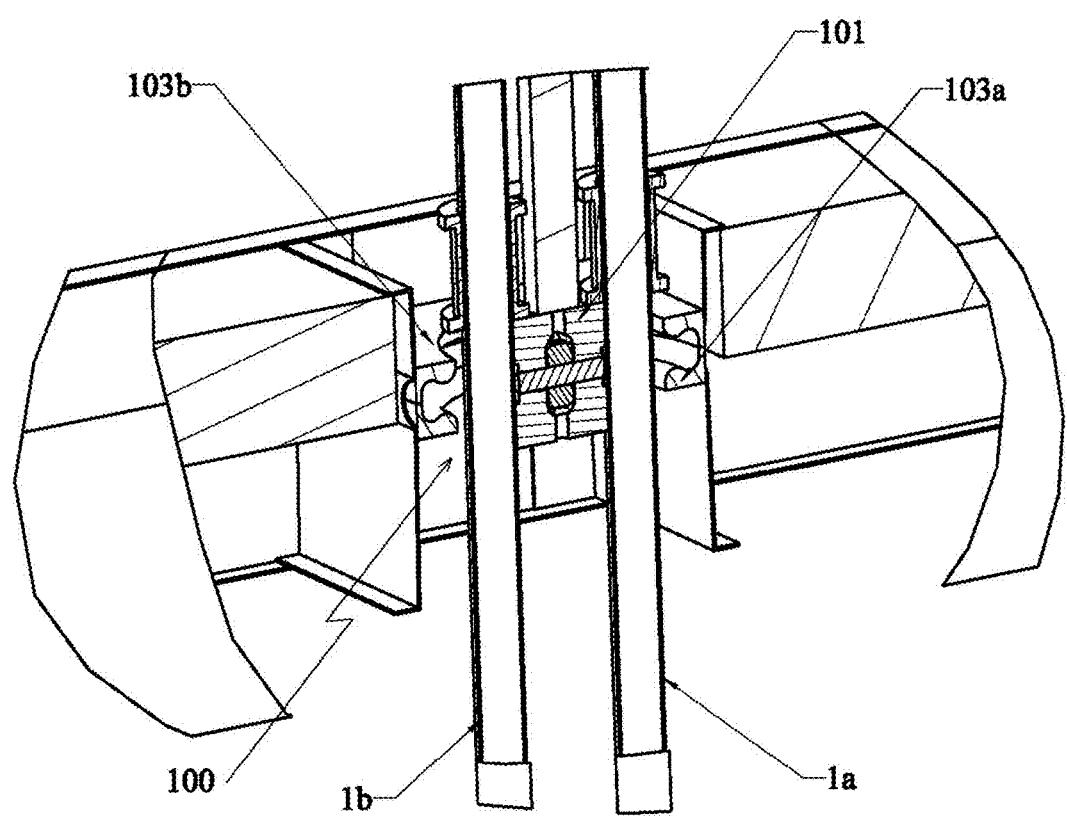
Figure 4E:
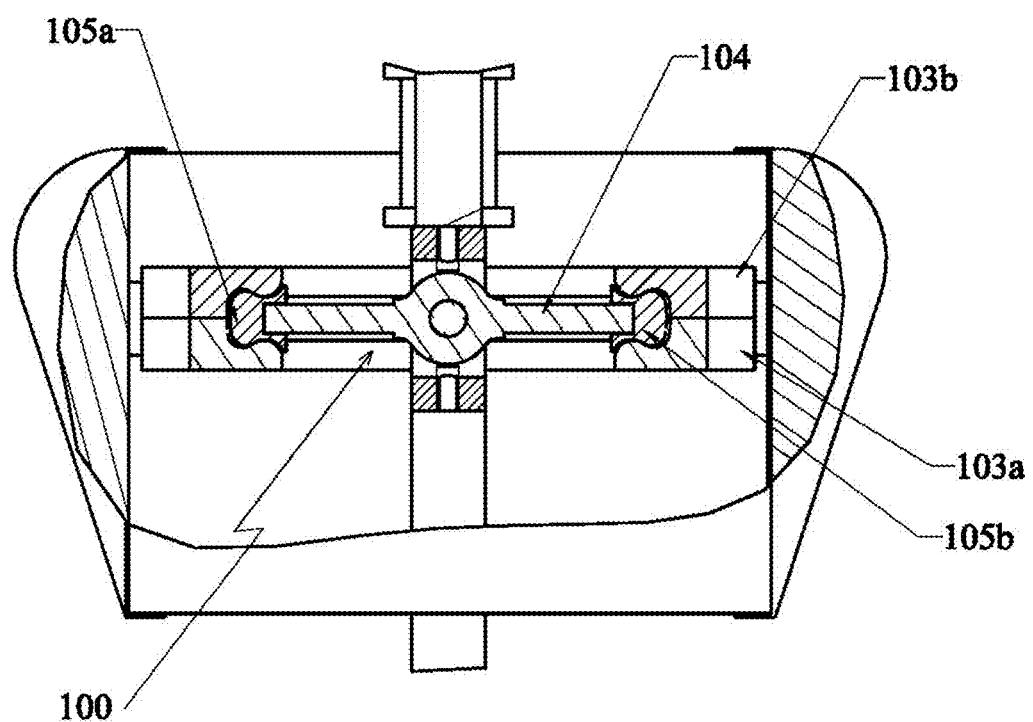
FIG. 4e illustrates a cross section of an example of embodiment.
Figure 8:
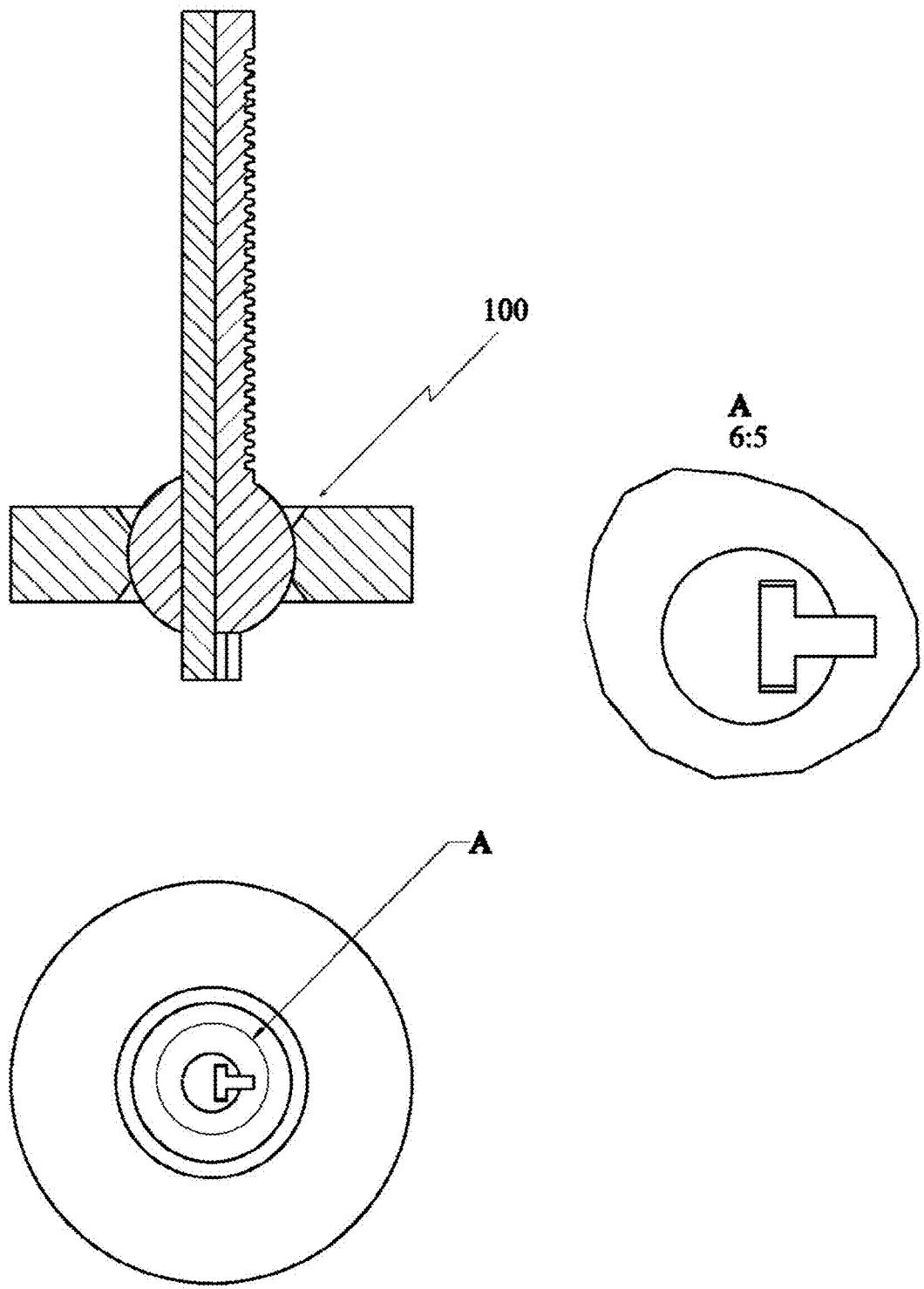
FIG. 8 illustrates another example of embodiment of a motion constraining device or motion constraining arrangement.

FIGS. 4e and 4d illustrates an example of a motion constraining device suitable to be connected to a transmission member being for example a rack. FIG. 8 illustrates another example of connecting a rack to a motion constraining device. As illustrated in the figure, a single ball joint 301 is sufficient to accomplish the task of the motion constraining device.

Figure 6:
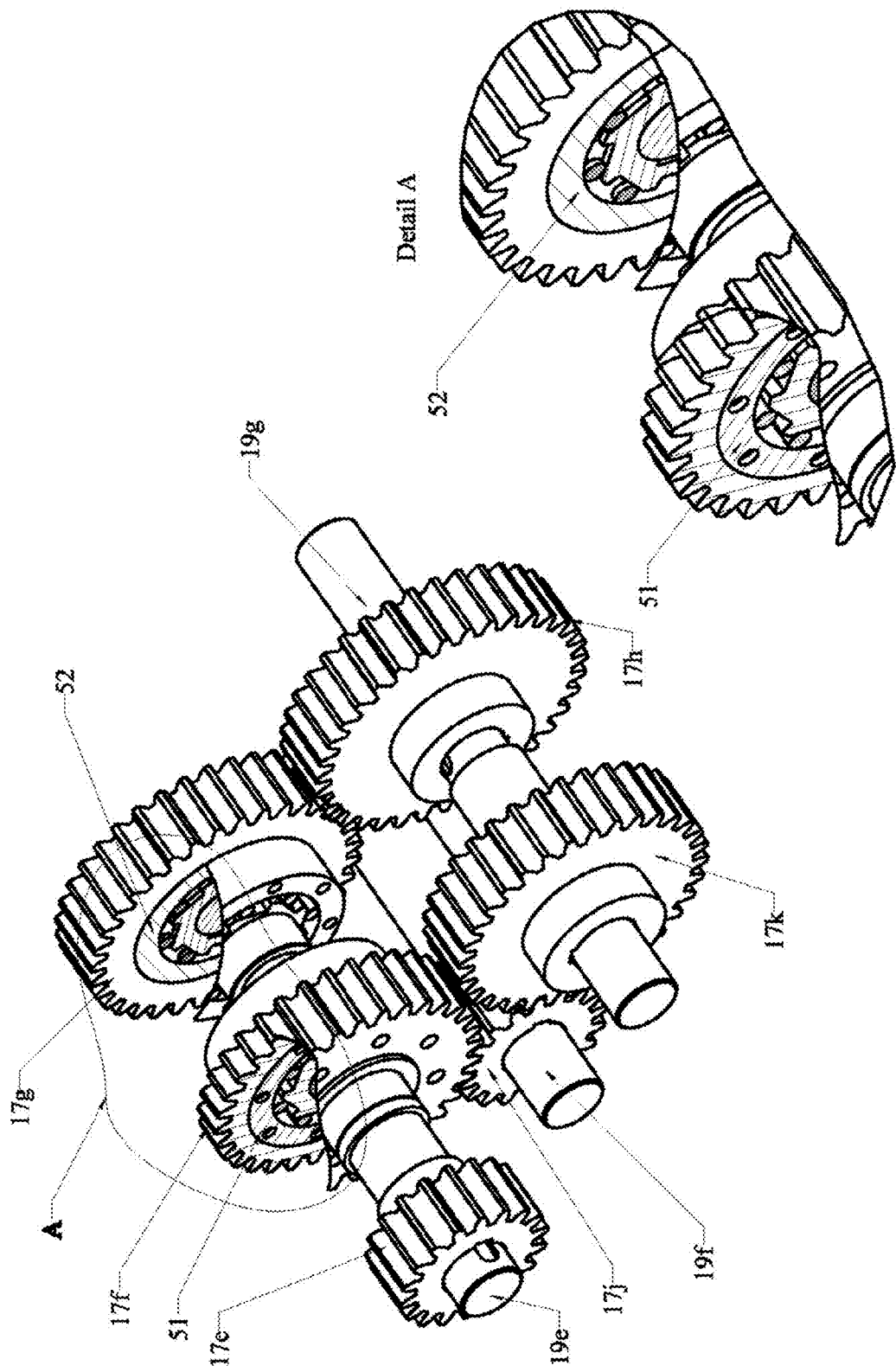
FIG. 6 illustrates an example of embodiment of a bidirectional movement to unilateral movement translation device according to the present invention.

FIG. 6 illustrates another example of embodiment of a system for bidirectional movement of a transmission member to a unidirectional movement of a shaft for example comprising a substantial simplification of the design.

Gear 17e is firmly coupled to the input shaft 19e of the mechanism, freewheel devices 51 and 52 are also tightly coupled to the shaft 19e, gears 17f and 17g are attached to the housing of freewheel devices 51 and 52. Gear 17g is coupled to gear 17h that is firmly attached to the shaft 19g, gear 17k is tightly connected to the other end of the shaft 19g, gear 17k is firmly coupled to gear 17j, which is tightly coupled to the shaft 19f, gear 17j is also coupled to the gear 17f. In an example, when the drive gear 17e rotates clockwise then the first freewheel device 51 is in a freewheeling state, and the freewheel device 52 transfer torque over paired gears 17g and 17h to the output shaft 19g which is further tightly coupled to the generator. When drive gear 17e rotates counter-clockwise then clutch 51 is in an engaged state, while clutch 52 is in a freewheeling state, torque is transferred through the coupled gears 17f, 17j and 17k to the output shaft 19g and then to the generator. Gear 17j in the mechanism is used to change the direction of rotation. The benefits of this design, as illustrated in FIG. 6, compared to the mechanism for example disclosed in PCT/RS2007/000015 is that one shaft less is used; connecting bushes, also used in aforementioned patent application, have also been removed. Therefore, this example of embodiment according to the present invention provides minimization of inertial forces in the mechanism providing transfer of torque to the input shaft of a generator. Therefore, this solution converts ocean waves with less amplitudes compared to known solutions in prior art.

According to an example of embodiment of the present invention, it is further possible to optimize the take out of energy from waves by tuning the natural frequency of the wave power plant, i.e. the frequency of motion up and down of the floating body and connected transmission member. The modification of the natural frequency of this system has the purpose of synchronising the frequency of the ocean wave system with the natural frequency of the wave power plant thereby providing a resonant condition.

As readily understood, the frequency of the sea wave system at a particular location is variable. However, there is usually a dominant weather condition and therefore a dominant wave system that can be observed and calculated as known to a person skilled in the art.

Figure 4F:
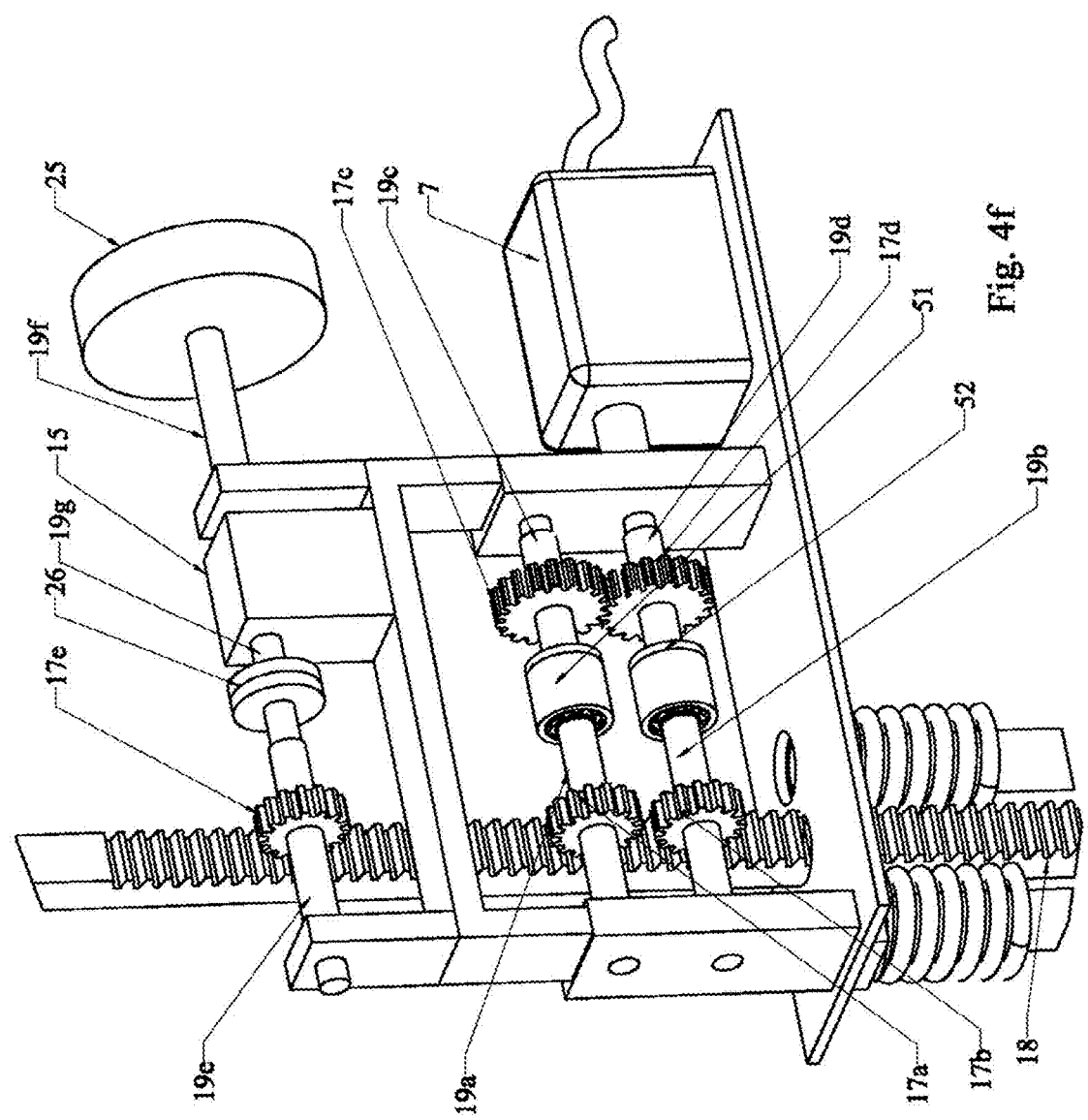
FIG. 4f illustrates an example of embodiment providing a modification of the natural frequency of the ocean wave power plant.
Figure 4G:
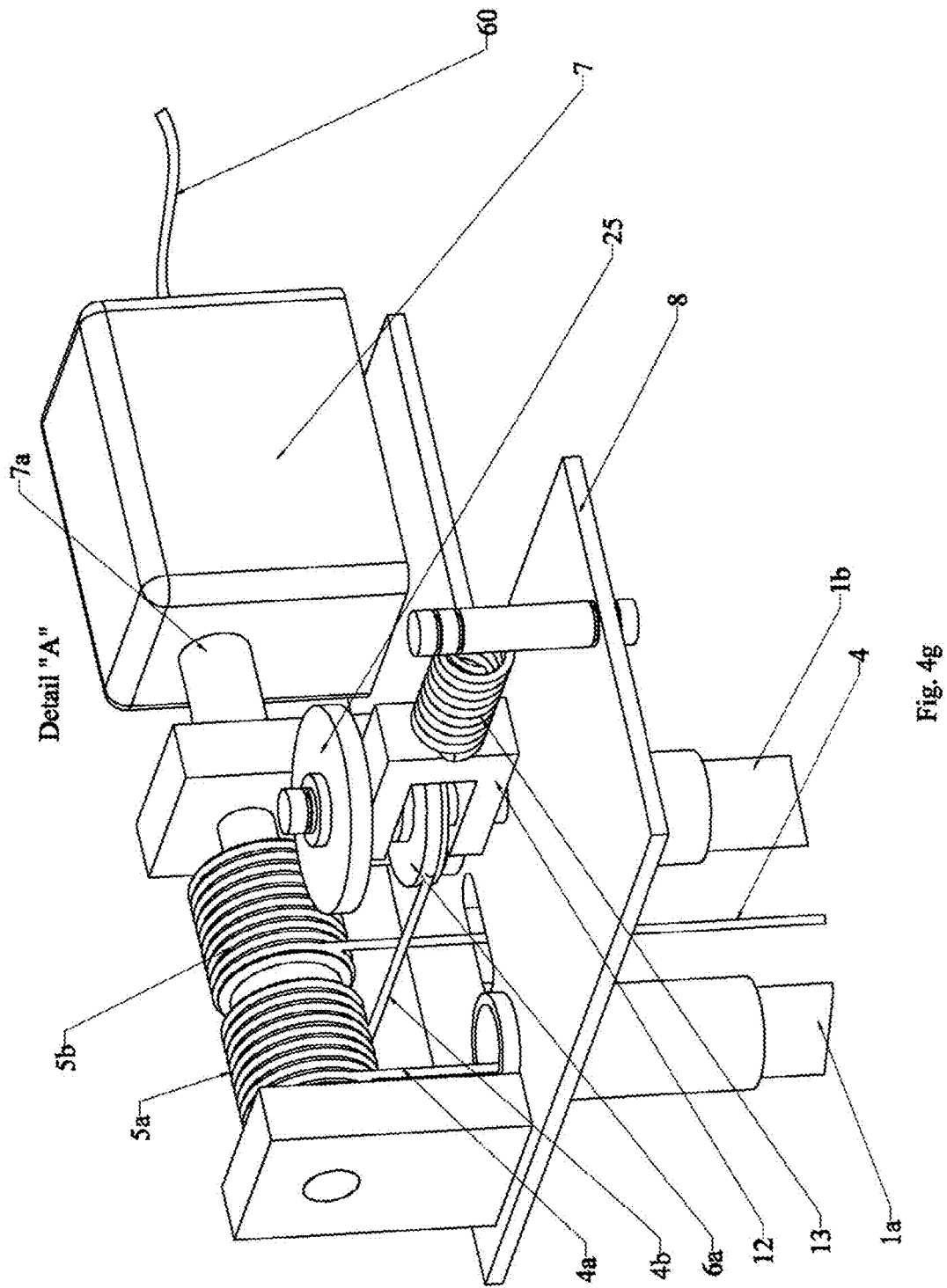
FIG. 4g illustrates another example of embodiment providing a modification of the natural frequency of the ocean wave power plant.

According to an example of embodiment of the present invention, a tuning or synchronization may be achieved by adding a flywheel to a rotating axis of the wave energy conversion chain as disclosed above. For example, in FIG. 4f it is illustrated how a flywheel 25 is connected to the axis 19f. The axis 19f is in communication the transmission member 18 which in this example is a rack gear construction. The gear 17e transfers the motion up or down of the rack 18 to the flywheel 25 via the safety clutches 26 and/or 15 and the shaft 19f. FIG. 4g depict another example of embodiment comprising a different location of the flywheel 25.

The effect of the safety clutches is to stop rotations if the waves are to high or powerful.

The synchronization effect is achieved as described above.

As readily understood, the weight of the flywheel provides the necessary added inertia providing the delay of the movement up or down of the rack 18. This added weight have to be correlated with the dominant frequency of the wave system on a specific location to provide the correct synchronization on this particular location.

The actual calculation of a concrete system may be performed in different manners as known to a person skilled in the art. Anyhow, a simplification may be achieved by considering for example a system of linear equations described below. This example of calculation has been provided by Professor Milan Hoffmann, department of mechanical engineering, Belgrade University, Serbia.

In prior art it is known that the heaving motion of a buoy is (approximately) governed by independent linear differential equation which, in regular waves, reads (equation 1):

$$(\Delta+m_s+m_\zeta)\ddot{\zeta}_B+(n_\zeta+n_e)\dot{\zeta}_B+\rho g A_{WL}\zeta_B=F_\zeta \sin(\omega t+\varepsilon_\zeta),$$

where $\Delta$ is buoy mass displacement, ms is supplementary mass, $m\zeta$ is hydrodynamic (added) mass, $n\zeta$ and ne are hydrodynamic and electrodynamic damping, respectively, $\rho$ is density of water, g gravitational acceleration, AWL waterline area of the buoy, $F\zeta$ is vertical force due to wave action, while $\varepsilon\zeta$ is wave phase shift. The equation is very similar to differential equation of a free symmetric body heaving in waves. The only (two) additional terms are supplementary mass ms, which includes the inertia of the moving parts connected to the buoy (e.g. gears, rotor, flywheel), and electrodynamic damping ne, due to the energy conversion.

Actually, one could distinguish two parts of the supplementary mass (equation 2)

$$m_s = m'_s + m''_s$$

where the mass $m'_s$ accounts the masses connected to the generator (transmission, rotor, eventual a flywheel, and cannot be avoided, while $m''_s$ is the mass intentionally added to the device for aim of tuning the natural frequency.

In the equation (1), it is assumed that generator moment is proportional to the angular velocity of the rotor (or, in the case of linear generator, that the force is proportional to the velocity of piston), so that the additional force acting on the buoy due to generator performance is (equation 3)

$$F_e = n_e \dot{\zeta}_B(t).$$

The solution of the equation, in frequency domain, is presented by transfer function of heave (equation 4)

$$P_\zeta = \frac{\zeta_0}{A_w} = \frac{f_\zeta}{\sqrt{(\omega_\zeta^2 - \omega^2)^2 + 4(\mu_\zeta + \mu_e)^2 \omega^2}},$$

where $\zeta_0$ and Aw are heave and wave amplitudes, respectively, $\omega$ is wave frequency, while nondimensional force amplitude $f\zeta$, damping coefficients $\mu\zeta$, $\mu e$ and natural frequency of heave $\omega\zeta$ are given as (equation 5)

$$f_\zeta = \frac{F_\zeta}{(\Delta + m_s + m_\zeta)}, \mu_\zeta = \frac{n_\zeta}{2(\Delta + m_s + m_\zeta)},$$

$$\mu_e = \frac{n_e}{2(\Delta + m_s + m_\zeta)}, \omega_\zeta^2 = \frac{\rho g A_{WL}}{(\Delta + m_s + m_\zeta)}.$$

The part of buoy power transmitted to the generator, equals (equation 6)

$$P_e = F_e \dot{\zeta}_B(t) = n_e \dot{\zeta}_B^2(t) = n_e \zeta_0^2 \omega^2 \cos^2(\omega t + \delta + \varepsilon_\zeta)$$
$$= n_e P_v^2 A_w^2 \cos^2(\omega t + \delta + \varepsilon_\zeta),$$

Where (equation 7)

$$P_v = \frac{v_0}{A_w} = \frac{\omega \zeta_0}{A_w} = \omega P_\zeta$$

is transfer function of buoy vertical velocity. The power Pe is available power—the mechanical power transmitted to the generator, available for the conversion into electricity. The mean available power, in one cycle of motion, is (equation 8)

$$\bar{P}_e = \frac{1}{T_w} \int_0^{T_w} P_e(t) dt = \frac{1}{2} n_e P_v^2 A_w^2,$$

where Tw is the wave period. It is usual to indicate the quality of WEC device by, so called, captured wave width bw, which presents the ratio of available power of the device to the power of waves. The power of unit wave front is the product of density of wave energy ew and wave group velocity uw, (equation 9)

$$P_w = e_w u_w = \frac{\rho g^2}{4\omega} A_w^2,$$

where the well known wave relations (equation 10)

$$e_w = \frac{1}{2} \rho g A_w^2, u_w = \frac{\omega}{2k}, \omega^2 = gk,$$

to the frequency of oncoming waves, by implementing appropriate supplementary mass ms to the device. As said, the supplementary mass accounts for the effects of inertia of accelerating parts connected to the buoy. The velocities $\omega j$ of the rotating parts are connected to the vertical velocity of the buoy $v_B = \dot{\zeta}_B(t)$ as (equation 11)

$$\Omega_R = i_R \frac{v_B}{r_R}, \Omega_F = i_F \frac{v_B}{r_{F1}}, \ldots$$

where rR, rF are radii of the input gears, $\Omega R$, $\Omega F$ are rotation velocities, while iR, iF are the rotating ratios of generator rotor, and of the supplementary flywheel, respectively. Thus, the supplementary mass could be put in the form (equation 12)

$$m_s = \frac{1}{r_R^2}\underbrace{(i_R J_R + \ldots)}_{m'_s} + \frac{1}{r_F^2}\underbrace{(i_F J_F + \ldots)}_{m''_s},$$

where JR, JF are moments of inertia of rotor and the flywheel, while sign " ... " stand for the i☐J products of the other rotating parts of generator and supplementary flywheel transmission. To tune the natural frequency of the buoy to the frequency of modal waves, (equation 13)

$$\omega_\zeta = \omega_m,$$

the supplementary mass (equation 14)

$$m_s = \frac{\rho g R_B^2 \pi}{\omega_m^2} - [\Delta + m_\zeta(\omega_m)]$$

has to be applied. Technically, the most suitable way to achieve this is by the proper choice of flywheel diameter. In an example of buoy performances (cylindrical buoy of radius 8 m, draught 2.7 m), is tuned to the modal frequency of the dominate storm (storm with modal period 10.5 s). The results indicate extreme benefits of the tuning. Vertical motion, velocity, power and captured wave width of the tuned buoy are greatly increased.

Even though it is possible to calculate weight and/or diameter of a flywheel according to a method as outlined above there might be a need for further optimization of the weight to achieve a best possible result, or to adjust the system to changing weather conditions. In an example of embodiment, the flywheel comprises a plurality of disk shaped bodies that can be added or be removed to/from the rotational shaft of the wave power plant the flywheel can be connected too. In this manner it is possible to adjust the weight or inert effect of the flywheel by adding or removing disc shaped flywheel elements.

Figure 9:
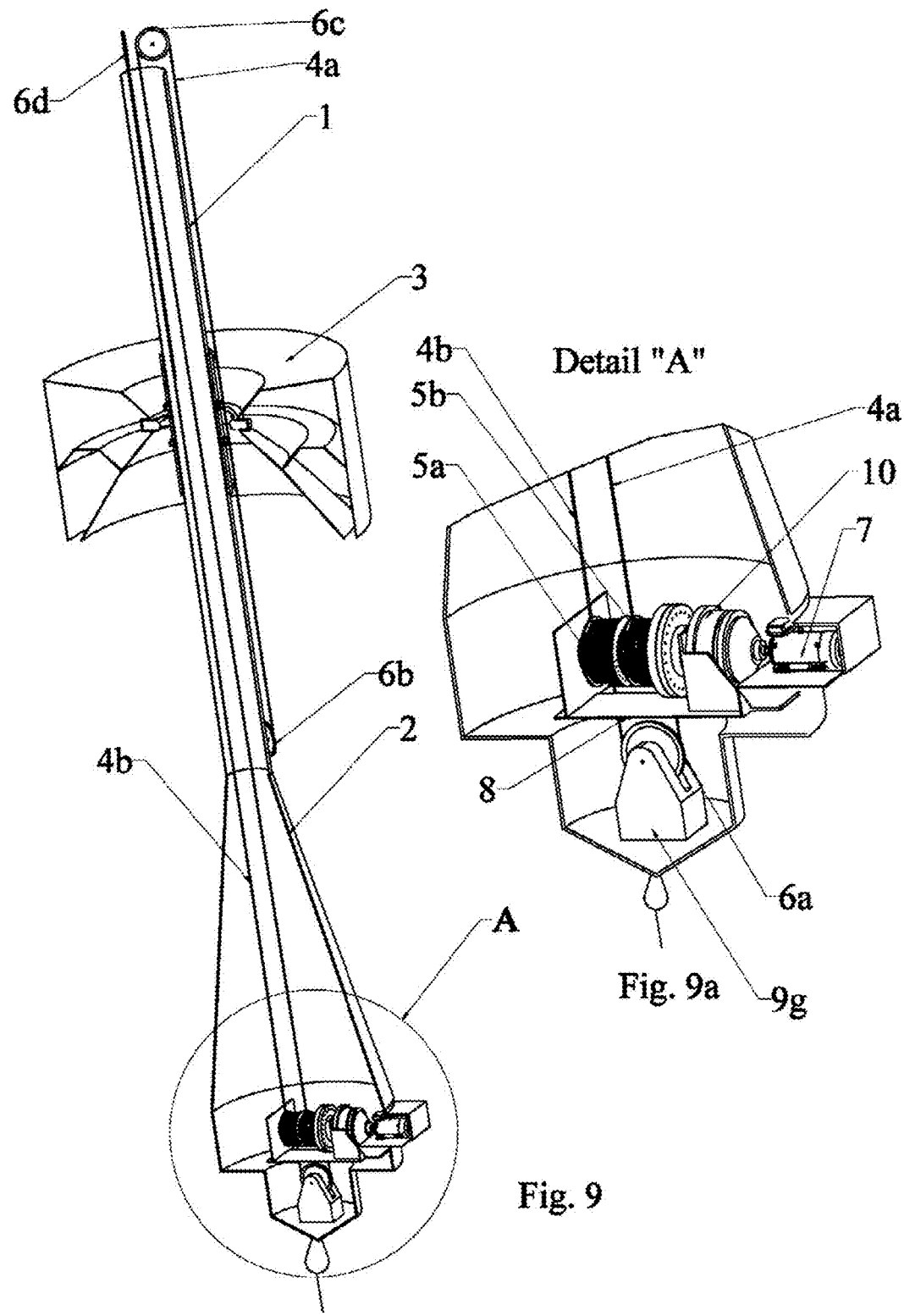

The wave power plant according to the present invention may be subject to environmental damage during the lifetime of an installation in the open sea. For example, salt water and growing of seaweb, different animals etc. may damage for example the transmission member. Therefore, it is within the scope of the present invention to arrange as much as possible of different functional units of the power plant inside the structure of the wave power plant itself. FIGS. 9 and 9a illustrates an example of embodiment providing protection for the functional elements.

In an example of embodiment, the uplift floating body 2 comprises the wave energy conversion mechanism as detailed in FIG. 9a. The floating body 3 is supported by the centrally located support column 1. As can be seen from the FIG. 9, the flexible transmission member 4a, 4b transfers the movement of the floating body 3 via pulleys 6c and 6d floated on top of the support column 1.

Figure 10:
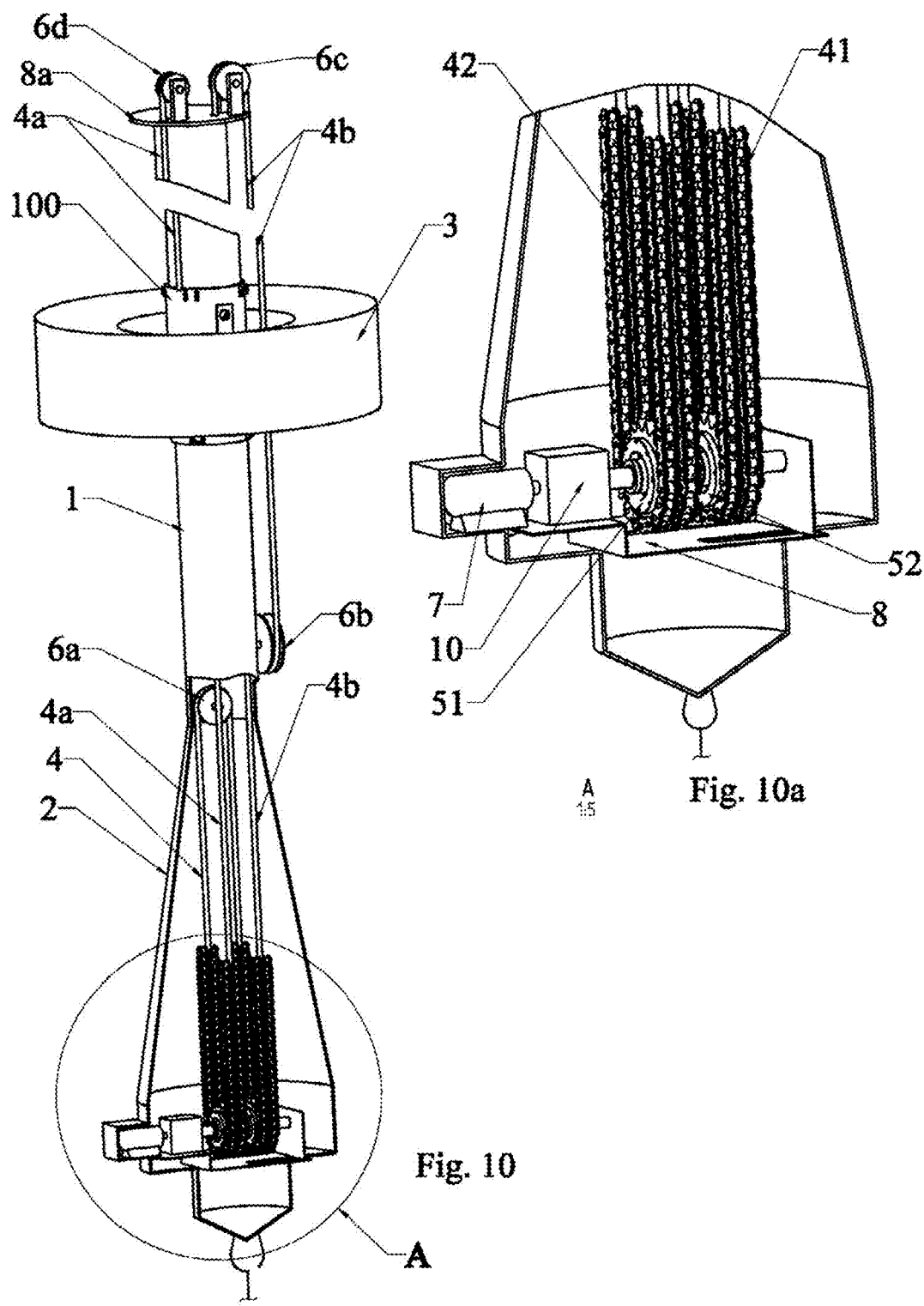
FIG. 10 illustrates another example an arrangement of a transmission member comprising a rope and a plurality of sections of chains.
Figure 11:
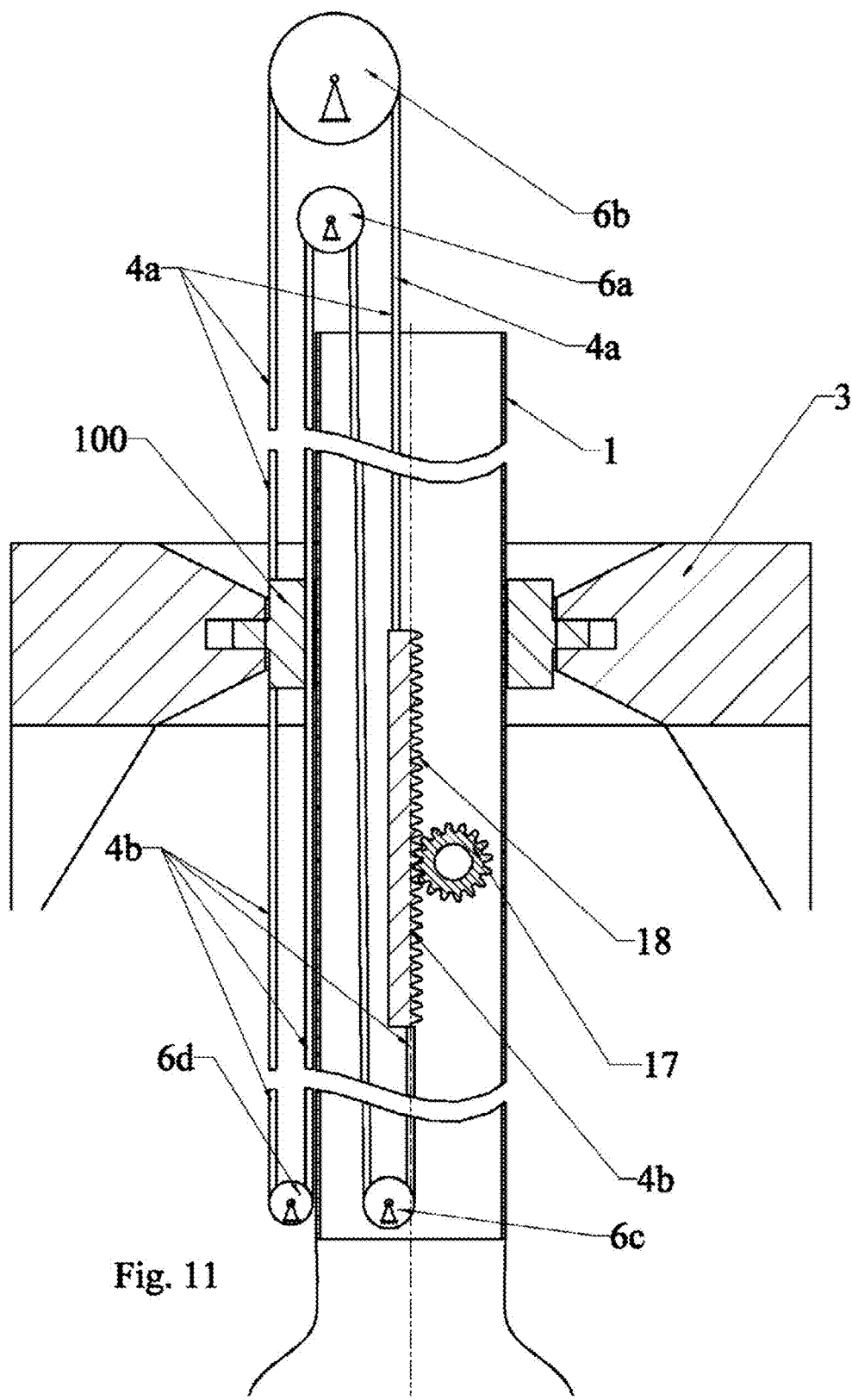
FIG. 11 illustrates another example of embodiment of a transmission member.

FIGS. 10 and 11 illustrates examples of embodiments of the present invention, wherein the transmission member 4a, 4b may be a composite construction. In FIG. 10 it is disclosed a combination of wire and cogwheel chains. The benefit of using cogwheel chains in combination with the energy conversion unit located inside the uplift floating body 2, is that the transfer of energy is much more effective as known to a person skilled in the art. It is within the scope of the present invention that the flexible transmission member (4, 4a, 18) can be made out of different materials like a rope, a wire, a chain, a rack, or is made out of different intercon- nected material sections, wherein a respective material section can be from materials like a rope, a wire, a chain, or a rack.

FIG. 11 illustrates the principle that it is possible to combine wires and a stiff rack gear construction. The wire 4a of the transmission member is connected to a respective top end of the rack gear 18 while wire 4b is connected to a lower end of the rack 18, wherein the combined wire 4a, 4b and rack 18 transfer movements to the gear 17 that can be in operational connection with an energy conversion unit as described above. It is also important to note that it is possible to have different diameters in the pulleys 6a and 6b for example. This has the effect of increasing the speed of movement up and down of the rack gear 18. This arrangement of pulleys can also be utilised to increase the movement up and down of an inductor in a linear generator. This increases the possible electric energy output from the linear generator. This possibility is disclosed in FIG. 12. FIG. 15 disclose more details about how the rack 18 may be arranged inside the cavity of the uplift floating body 2. The arrangement of combining wire and rack provides a better transfer of torque.

In the example of embodiment depicted in FIG. 10, most of the functional units of a wave power plant is arranged along a vertical axis that is mostly located inside an encapsuling provided for by the uplift floating body 2 itself but in addition with an continuation of the uplift floating body 2 as an elongated tube protruding above the water when installed in the sea. The protruding part constitute corresponds to the support structure 1a and 1b as disclosed in other examples of embodiments. This example of embodiment of the uplift floating body 2 provides besides buoyancy also a protection of the installed mechanical and electric parts from environmental damage.

Figure 12:
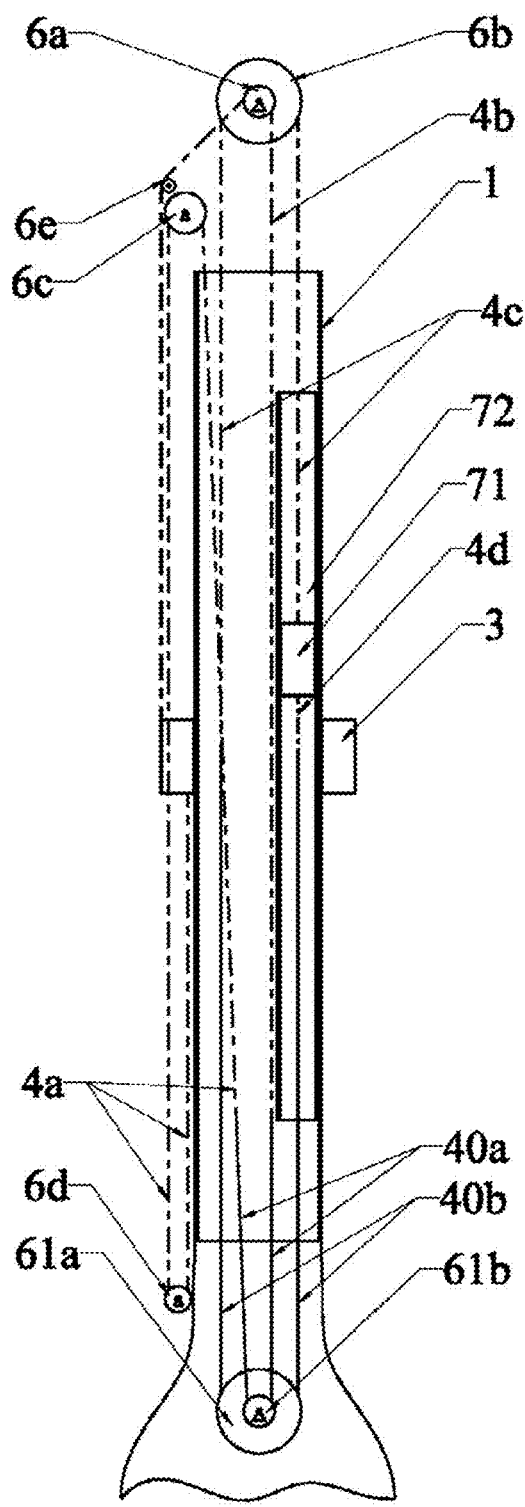
FIG. 12 illustrates how a linear generator can be arranged with pulleys providing an accelerated movement of the inductive element of the linear generator.

In FIG. 12 the different sized pulleys 61a and 61b in combination provides an increase in the speed of movement of the linear inductor 72 connected via the transmission member 4a, 4b and 4c being in operational contact with the pulleys 61a and 61b providing an increased electric generation via the magnet 71. In this example of embodiment it is preferable to use an arrangement comprising a combination of wires and chains as disclosed in FIG. 10. The use of chain provides a better transfer of torque since just a wire may be elastic.

FIG. 14a depicts another example of embodiment of a floating body that can be used in embodiments of the present wave power plant. The floating body comprises a plurality of a second cavity 36 and a plurality of a second chambers 3 and a plurality of vents 31, 32 above every plurality of the first cavity 33 that provides an increased weight of the floating body with the added water which is beneficial when the floating body is falling down when a sea wave amplitude is going down as described above. In this example of embodiment a plurality of cavity are arranged and the corresponding openings 3h, 3f in the bottom section as depicted in FIG. 3 is replaced by letting each bottom section of the plurality of cavity 36 be open. When a part of the total bottom of the floating body is leaping out of the sea the corresponding cavity 36 facing free air will be emptied. However, since there are many cavity left with water the effect on the loss of weight is neglibale. However, this design provides a solution to the so called slamming problem.

In irregular waves it may frequently happen that the bottom of the floating body leaps out of the water. When the floating body moves down again the part of the bottom surface that is out of the seawater will enter the seawater again. Since the bottom may be a flat surface the impact on the construction can be formidable and damaging to the construction. In the example depicted in FIG. 14a, the part of the surface that will hit the water again will be the open bottom surface of the emptied cavity 36. Therefore the surface that hits the wave is actually air. Water will start rapidly to be filled inside the cavity 36 and the air between the water surface entering the cavity 36 and the roof of the cavity 36 will be compressed the corresponding one-way vent 31, 36 in the roof of the cavity will let out the air. However, if the capacity of the one way went to let out air is reduced, for example by reducing the size of the opening, the air will be aired out slower compared to a fully opened vent. Therefore this arrangement will provide a cushing effect when the bottom of the floating body hits the water. This cushing or dampening effect will mitigate the effect on the construction due to the slamming. FIG. 14b illustrates the cavity and one way vents as seen from above while FIG. 14c illustrates a see through perspective view of the floating body.

In other examples of embodiments of the present invention, any shape of the floating body facing the water surface that provides wave piercing capability is regarded as being within the scope of the present invention.

Another interesting aspect of the example of a floating body providing damping of the slamming problem also can be used in a solution for obtaining resonance or synchronization of the natural frequency of the ocean wave power plant. The added mass of the water may provide the additional weight that is necessary to have, Further it is readily understood that the tuning of the frequency may be achieved by the amount of water present in the cavity of the floating body. Increasing the weight is done by adding more water, decreasing the weight is done by tapping water from the floating body. Alternatively, the size of the cavity 36 may be adjusted by for example adjusting a position of an upper surface of the cavity 36.

In another example of embodiment of the present invention, the fly wheel is used and is calculated for a defined dominant wave frequency. The fine tuning is achieved by adjusting the level of water in the floating body. The adjustment may be achieved by opening the one-way vents 31, 32 since there is always some compressed air inside the at least second cavity (36) that then will be aired out thereby providing more water in the at least second cavity (36). Other methods utilizing pumps etc. is also possible to apply.

Another aspect of the present invention is to provide a method for installing an ocean power plant according to the present invention in a cost effective manner. These constructions can represent huge loads on equipment and the logistic of such operations can be complicated. It is a need to provide a simple but yet effective ocean wave power plant that at the same time need to be simple to deploy. It is also within the scope of the present invention to provide a solution for moving or changing a deployment location for an ocean wave power plant. Changing conditions on a deployment location may result in a need for moving an installation. Other reasons could be maintenance, conflict with existing shipping lanes etc. According to the present invention, examples of an uplift floating body 2 may be provided as a part of the structure of the ocean wave power plant being submerged at an installation location providing a stabilisation of the support structure of in open sea. The problem is then to transport a specific embodiment of the ocean wave power plant to a specific location and then submerge the installation and fasten the installation to an anchoring mass 9e.

It is also important to bear in mind that the positioning of the ocean wave power plant must be achieved with a certain amount of precision due to design constraints with respect to for example depth of water at the installation location etc. and that the uplift force provided for by the uplift floating body 2 may be considerable.

Figure 7:
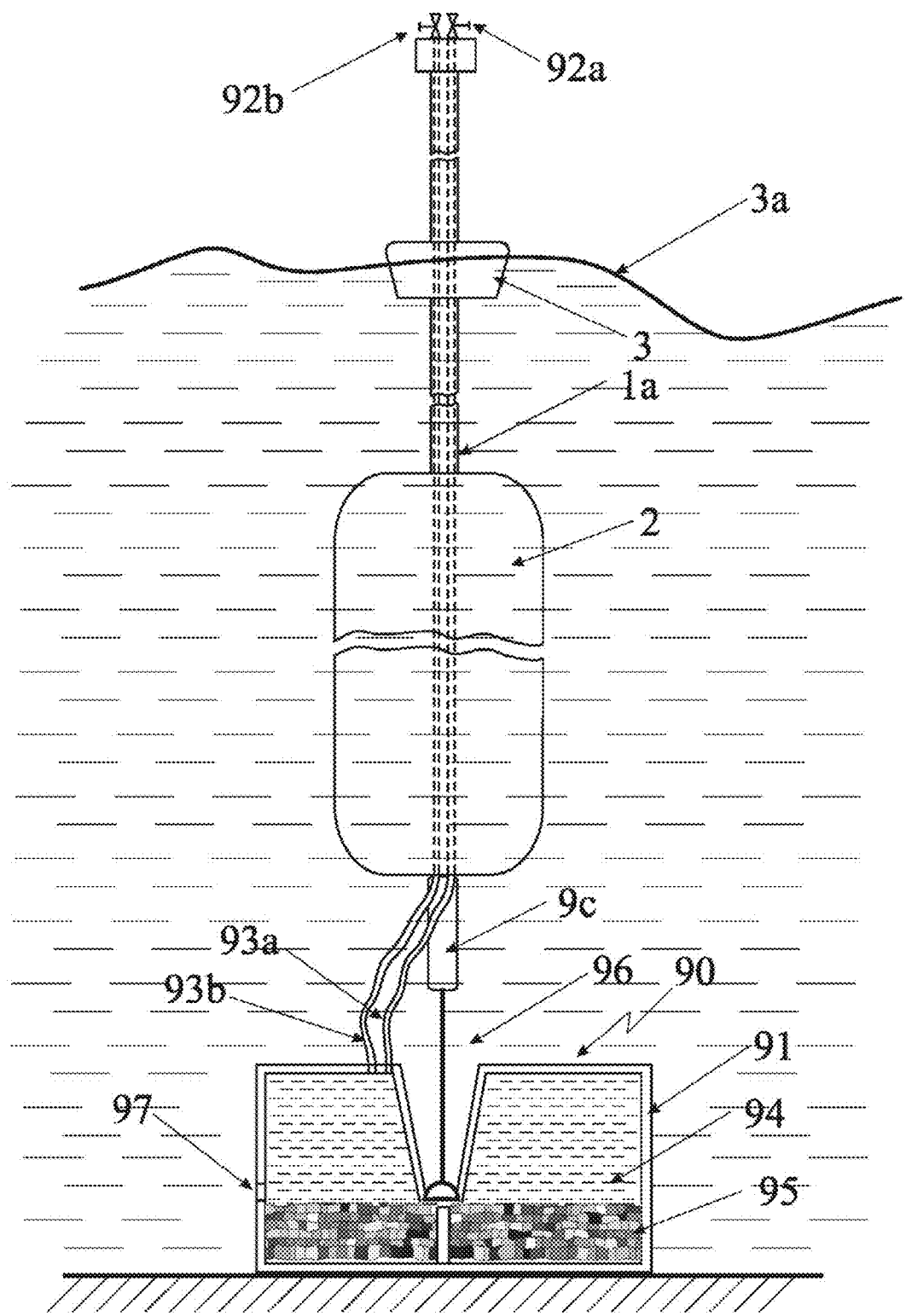
FIG. 7 illustrates an example of attachment of an uplift anchor to an example of embodiment of the present invention.
Figure 7A:
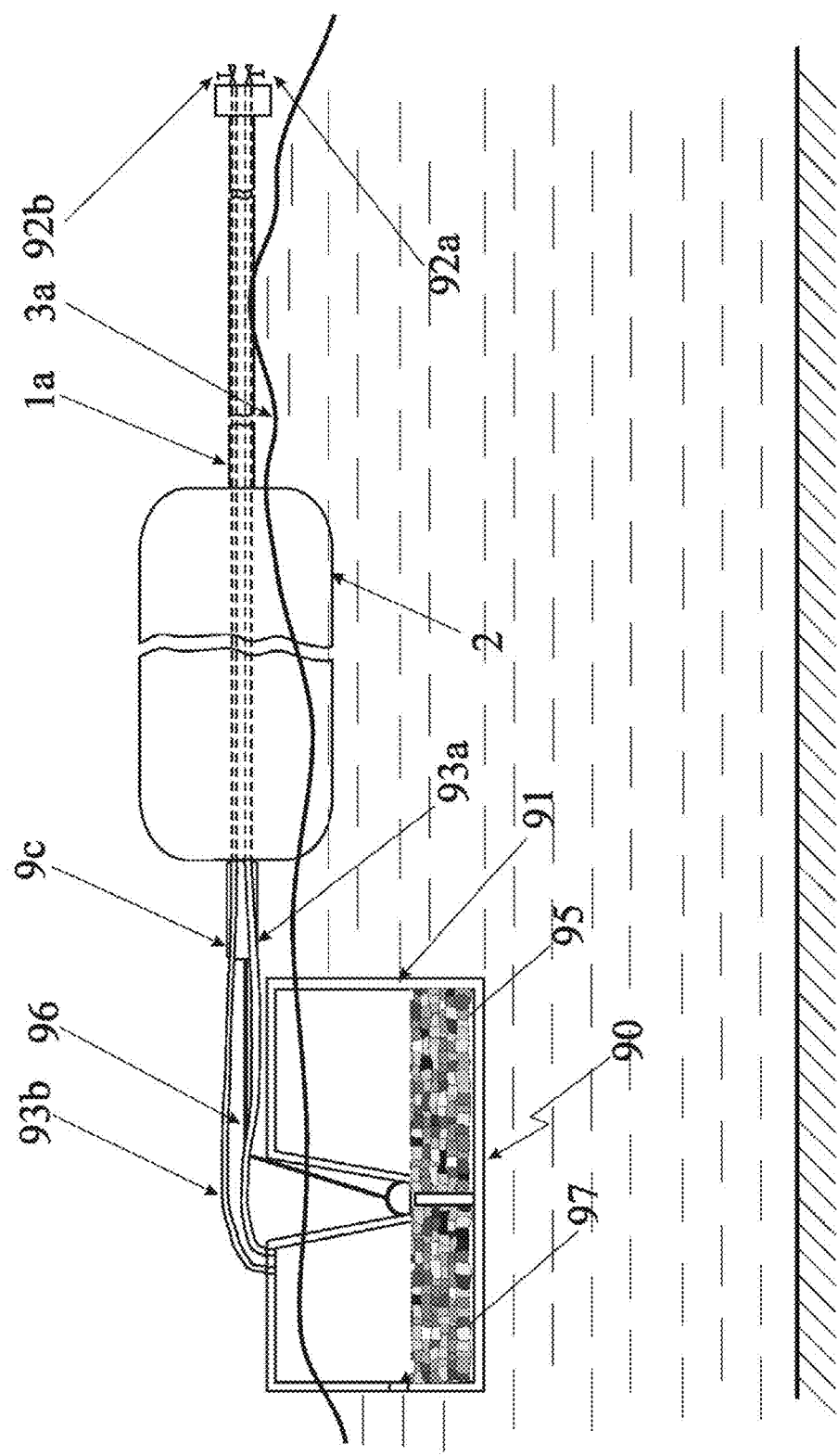
FIG. 7a illustrates how an example of embodiment of the present invention may be transported to a location for deployment in the sea.

FIG. 7 and FIG. 7a depicts a self-lifting anchor 90 according to the present invention and the manner of its operation and installation.

The illustrated example of self-lifting anchor 90 comprises a casing 91 filled with a layer of stones (gravel) 95. The remaining volume 94 of the casing 91 may be filled with water or air; on one of the lateral side faces of the self-lifting anchor there is a valve 97 that can be used to empty for example water or air from the cavity 94. Valve 92b and a tube 93b, and a valve 92a and a hose 93a can be stretched all the way to the top point of the ocean wave power plant form for example the top surface of the self lifting anchor 90. The connection point of the anchor chain 96 being connected to the bracket 9c on the bottom surface of the uplift floating body 2 is provided for as a deep recess in the top surface of the self-lifting anchor 90. In this manner the anchoring point is closer to the gravel 95 (the centre of mass) located at the bottom of the cavity 94.

The self-lifting anchor 90 functions in the following manner in an example of embodiment: when the structure of an example of embodiment according to the present invention is transported to a location for anchoring (FIG. 7a), one part of the volume 94 of the self-lifting anchor comprises compressed air while the rest of the volume 95 is filled with stones or (gravel), but the anchor is still free to float on the water surface, the structure is attached to the anchor by means of chains, ropes or other flexible element between a fastening bracket 96 on a top surface of the anchor 90 and a fastening bracket 9c terminating the lower end of the support structure of the ocean wave power plant, the fastening bracket 9c is located below the uplift floating body 2. The buoyancy of the anchor 90 and the uplift floating body 2 makes the whole combined structure capable of floating on the surface of the ocean.

Therefore it is possible to tow the combined structure with a boat to a deployment location. I an example of a method for deployment of an ocean wave power plant according to the present invention the filling of water in a volume 94 provide a sinking of the whole installation towards the bottom of the sea. A first step of a method comprises fastening of the anchor 90 to a support structure of an ocean wave power comprising an uplift floating body 2. If a subsystem for power generation (for example subsystem A in FIG. 1) is to be located at a top end of the support structure, in a further step this subsystem may be transported on board the ship during transport. If the power generating subsystem is located inside the uplift floating body as depicted in FIG. 2 and FIG. 9, this subsystem can be transported inside the uplift floating body 2. Moving parts of the power generating subsystem may be locked by locking pins that in a further step can be released by pulling them out via chains or ropes accessible from the top side of the uplift floating body 2. This access may be provided via a releasable cover that in a further step can be fastened again after utilization. The floating body 3 may not be attached to either the support structure or the transmission member the way it is in the depicted examples of embodiments in FIG. 1, 2 or 4 when the structure is transported as depicted in FIG. 7a.

However, the floating body 3 may be towed separated from the structure together with the assembly illustrated in FIG. 7a. The problem is then to be able to assemble the floating body 3, the power generating subsystem and the support structure into a functional wave power plant.

A crane onboard a ship may be used to lift and position the floating body onto the support structure after the system has been positioned with the self lifting anchor. The assembly of the power generating subsystem on a top end of the support structure can also be accomplished by the crane on board a ship lifting the subsystem in position and then fastening the subsystem to the support structure.

It is also within the scope of the present invention to provide the floating body 3 as two respective sections being provided for by dividing the floating body along a central line passing the centre of the through hole of the floating body. When these two halves are combined, for example with bolts, the total shape is the same as the whole floating body. When attaching the floating body to the support structure on location, it is then possible to move the respective halves of the floating body towards the support structure from opposite sides thereby making it possible to connect the two halves together when the support structure passes the through hole.

It is further within the scope of the present invention to transport the floating body (3) when it is assembled onto the support structure (1a, 1b). This can be done by arranging floats on the ends of the floating body (3). Then the floating body (3) is located above water when the installation is towed by a boat.

The assembly of the transmission member can be somewhat differently if it is a fixed shaft with rack and pinion gear or a flexible transmission member like a wire, for example. A fixed shaft can be assembled and be part of the support structure before towing the structure. Attachment of the floating body 3 to the fixed transmission member can be done in a step comprising attaching the motion constraining device to the centre of the floating body 3. Examples of embodiments of the motion constraining device are embodied to simplify such an assembly A flexible transmission member can be assembled after all the other parts have been assembled as readily understood. However, when the flexible member is located inside one of the respective support structures, like column 1a in FIG. 1b, it is possible to tow the flexible member as part of the installation. The part of the flexible member that is not operatively connected to the power generating subsystem and/or the floating body 3 might be transported wound upon extra pulleys, for example attached to the pulley 6b. After the power generating subsystem is attached and the floating body 3 is in place the flexible transmission member can be respectively attached in the respective operative positions.

When the structure is towed in position above a desired sea bed location, the anchor is sunk by opening the valve 97 filling water into the cavity 94 while the valves 92a and/or 92b are opened letting out air from volume 94 as the volume is filled with water. For example, volume 94 is filled with water making the anchor heavier, and therefore it sinks. It is possible to use only one of the valves 92a and 92b. However, by using two valves it is possible to control the speed of sinking or rising of the self lifting anchor. Afterwards valves 92a and 92b are closed when the operation is finished. This feature can also be used in an assembly process for the power generating subsystem and the floating body 3. Instead of directly towing the structure to the desired deployment location, the structure is first towed to deeper water enabling sinking of the structure, but still floating in the sea, to a level wherein the top of the support structure is below the surface of the ocean which is enabling towing the floating body into a position above the top of the support structure. A next step is then to blow pressurized air into the hose 93a for example and opening the valves 92a and 92b. Even if they are under water the pressurized air will prevent water from entering these valves. The pressurized air will empty the water filled in the volume 94 and the whole structure is lifted up through the through hole in the centre of the floating body. A next step is then to assemble the motion constraining device around the support structure before attaching the device to the floating body 3. After this operation the power generating subsystem can be positioned and be attached to the support structure. A flexible transmission member can also now easily be attached correctly to the power generating subsystem and the top side of the floating body. The next step is then to continue to pump air and evacuate water from volume 94. When the installation is floating high in the water the other end of the flexible transmission member can be attached to the bottom side of the floating body 3. The next step is then to tow the completely assembled installation to the desired location for deployment and then fill water in the volume 94 as described above.

The arrangement of two valves 92a and 92b may be utilized in sinking and lifting operations in different manners. However, it is important to use at least one of these valves to compensate for increased pressure of air when lifting the structure. The situation is similar to the situation when a person is moving upwards in the water.

This person must let out some air from his lungs when he moves upwards to compensate for the expansion of the air in his lungs.

This feature of the self lifting anchor 90 that it is possible to both sink and lift may also be used to move an installation from one location to another, or raise the installation upwards from the seabed to facilitate possible service and maintenance of the installation.

The utilization of a self-lifting anchor provides simple and easy positioning of the structure onto the desired sea bed location, provides simpler maintenance conditions for the ocean wave power plant structure, and what is most important, by the use of self-lifting anchor 90 the costs of both positioning and maintaining the system at a permanent sea bed position are considerably reduced.

However, sometimes the self lifting anchor can be buried deep into the bottom of the sea, for example because of loose sand on the bottom. Then it can be difficult to lift the installation by the mentioned method as described above. Then it is possible to loosen the chain 96 from the attachment to the self lifting anchor. The installation can still be controlled since it is possible to utilize a longer chain during such situations. The floating body 2 may keep the installation in an upright position.

According to an example of embodiment of the present invention, a method for deployment of an ocean power plant comprises steps of:

attaching a self-lifting anchor 90 an ocean power plant according, filling compressed air in the cavity 94 of the self-lifting anchor 90 via the vent 92a and hose 93a while the vent 92b is closed, thereby the self-lifting anchor 90 will float on the water, towing the ocean power plant together with the self-lifting anchor 90 to a location the ocean power plant is supposed to be located on, sinking the self-lifting anchor 90 by opening vent 92a and vent 92b and then filling water inside the cavity 94 via the vent 92a and the connected hose 93a while the compressed air in the cavity 94 is aired out through the vent 92b via the hose 93b.

Figure 13:
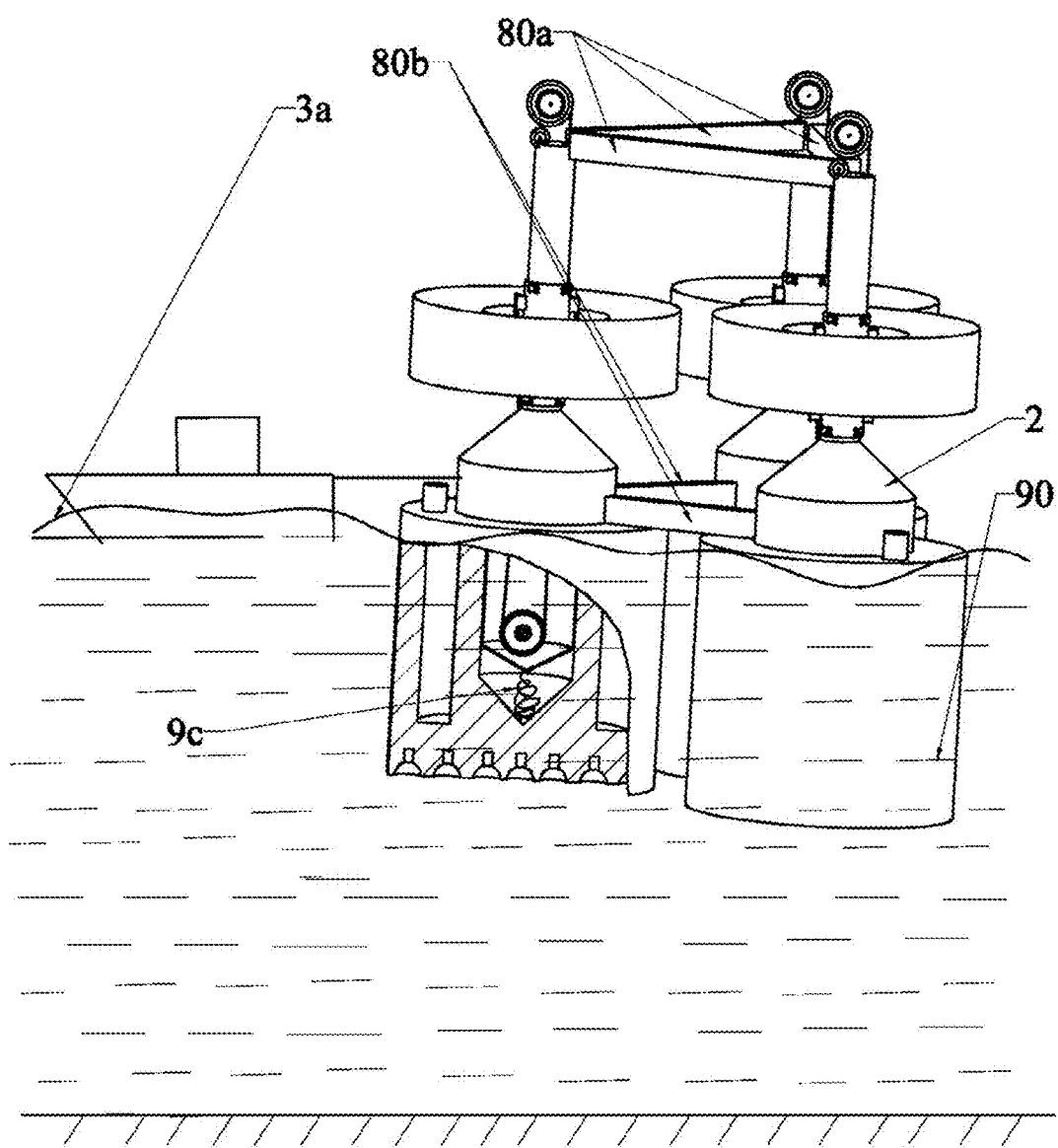
FIG. 13 illustrates an example of embodiment of the ocean wave power plant comprising three interconnected wave conversions systems and how this system may be transported at sea.
Figure 13A:
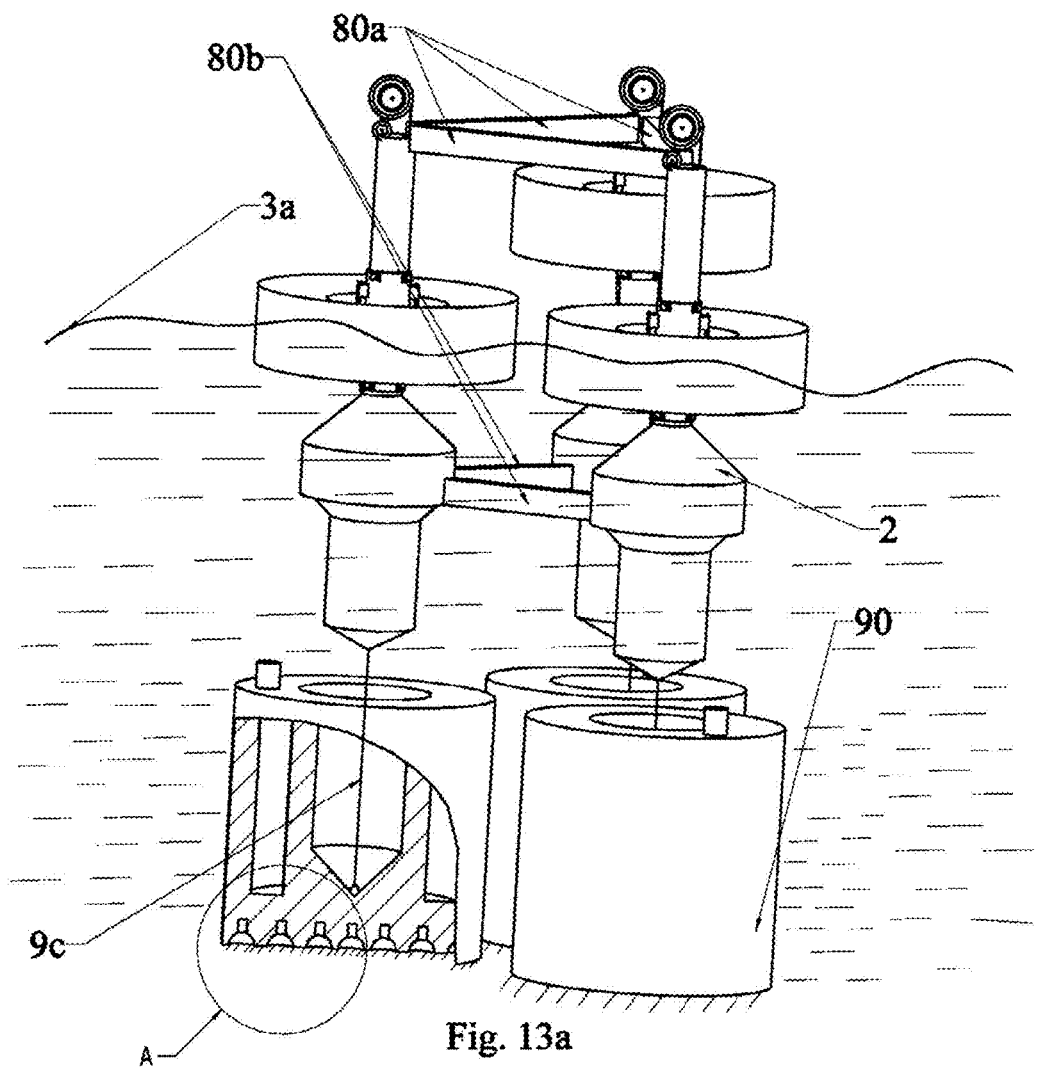
FIG. 13a illustrates how the wave power plant in FIG. 13 may be deployed on a location at sea.
Figure 13B:
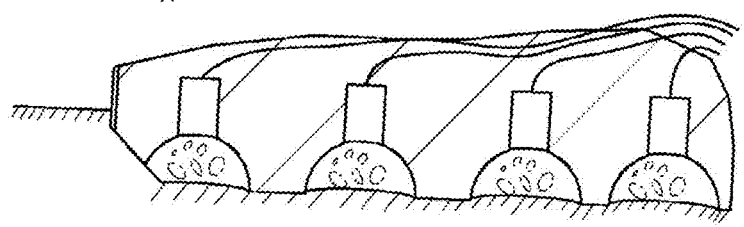
FIG. 13b illustrates an example of deployment of the ocean wave power plant.

FIGS. 13a and 13b depicts a system comprising three submergible wave power plants according to the present invention. The three respective wave power plants are interconnected via the rigid connections 80a on the top and the rigid connections 80b on the bottom part of the combined system. The uplift floating bodies 2 are fitted inside the self lifting anchors 90 as depicted in FIG. 13 and can be transported by for example a ship. FIG. 13a depicts how the self lifting anchors 90 may be lowered and be kept in place by the anchor chains 9c. As depicted in FIG. 13 the anchor chain 9c may be stored wounded up in an arranged space in the bottom part of the self lifting anchor 90. This feature allows to have standard lengths of anchor chains since it is only necessary to wound out the actual length of anchor chain for the actual location of deployment.

According to another example of embodiment of the self lifting anchor, it is possible to arrange explosives on the bottom of the sea bed under the self lifting anchor as depicted in FIG. 13b. It is known in prior art that a surface facing towards the bottom of the sea may be kept in place because when one tries to lift a body a vacuum effect may be present in the interface between a body and the bottom surface. When the self lifting anchor is about to be moved, ignition of the explosives counter the effect of the vacuum.

Another example of embodiment of the present invention comprises different solutions for providing sustainable lubrication of moving parts. For example, a telescopic arranged cover around a rack and pinion gear may comprise graphite grease. This arrangement shields the rack and pinion gear and at the same time is providing lubrication. It is within the scope of the present invention to comprise any form of lubrication materials and systems to maintain the operation of the system.

Another example of embodiment of the present invention comprises arrangements for mitigating effects of icing of an installation at sea. For example, it is within the scope of the present invention to provide heating of structural parts thereby providing de-icing of an installation. Further it is within the scope of the present invention to provide any form of encapsulation, shields etc. of an installation to protect the installation from environmental impact and damage. For example, a floating body 3 may comprise a flexible cover on the top surface protecting the through hole.

The invention claimed is:

1. An ocean wave power plant comprising:
an anchoring mass that is adapted to rest on an ocean sea bed;
a generally vertical support structure positioned directly above the anchoring mass and having an upper end that extends above a surface of the ocean and a lower end that is connected to the anchoring mass by a flexible connector that allows the support structure to swing with respect to the anchoring mass when deployed in the ocean;
a submergible uplift floating body separate from a point on the support structure above the anchoring mass and below the surface of the ocean, the submergible uplift floating body providing buoyancy for the support structure, acts to prevent rotation of the support structure and allows the support structure to pivot with respect to the anchoring mass,
an electric power generating subsystem supported by a platform located at the upper end of the support structure above the surface of the ocean,
a floating body, having a first cavity filled with air and a second cavity that can be filled with water through at least two openings located on a bottom side of the floating body when the floating body is deployed in the ocean, the floating body also including one-way vents that are arranged with openings on a top surface of the floating body and channels that are connected to the second cavity to provide paths for venting air when water is filling the second cavity, wherein the one-way vents provide a reduced size of the openings located on the top surface with respect to the at least two openings on the bottom surface thereby providing dampening of abrupt floating body movements by restricting the venting, wherein the power generating subsystem is arranged inside the submergible uplift floating body,
a transmission member attached at one end to the floating body and at a second end to the power generating subsystem transferring wave motion from the floating body to the power generating subsystem, a portion of the transmission member is positioned within the support structure;
wherein the support structure, the floating body, the submergible uplift floating body, the flexible connector, the power generating subsystem, the anchoring mass, at least a part of the transmission member is arranged functionally interconnected along a common axis, wherein each power plant is arranged as weight symmetrically as possible around the common axis, wherein the support structure is guided through a hole in the floating body and is fastened to the submergible uplift floating body, wherein a motion constraining device is arranged in a center of the through hole, wherein the part of the transmission member is arranged along the common axis and is connected to a center point on a top side of the motion constraining device, and is oriented along the common axis and is further connected to a bottom of the motion constraining device.

2. The ocean power plant according to claim 1, wherein the transmission member is a flexible transmission member, the power generating subsystem comprises a bidirectional to unidirectional conversion mechanism driving a shaft of an electric generator, the shaft comprises a first pulley and a second pulley, the first pulley comprises a first freewheel device connected to the shaft, the second pulley comprises a second freewheel device connected to the shaft, the transmission member is guided from the support structure and is engaged to the first pulley on a front side of the first pulley, the front side of the first pulley being a side of the first pulley in an axial direction of the shaft furthest from the electric generator, the transmission member is further guided out from the first pulley from a back side of the first pulley towards and wound around a third pulley supported by a supporting arm the back side of the first pulley being a side of the first pulley in the axial direction of the shaft closest to the electric generator, the supporting arm providing tension on the transmission member, the transmission member is further guided towards the second pulley and is engaged to the second pulley on a back side of the second pulley, the back side of the second pulley being a side of the second pulley in the axial direction of the shaft closest to the electric generator, the transmission member is further guided out of the second pulley from a front side of the second pulley, the front side of the second pulley being a side of the second pulley in the axial direction of the shaft furthest from the electric generator, the transmission member is further guided towards the floating body along the common axis of the ocean wave power plant.

3. The ocean wave power plant according to claim 1, wherein the transmission member comprises a rack and a pinion gear, the power generating subsystem comprises a bidirectional to unidirectional conversion mechanism driving a drive shaft of an electric generator, wherein the pinion gear comprises first and second gears being simultaneously engaged by the rack, wherein the first gear is connected via a first shaft to a first freewheel device, wherein the second gear is connected via a second shaft to a second freewheel device, the first freewheel device engages a third gear on a third shaft, the second freewheel device engages a fourth gear on a fourth shaft, wherein the third gear engages the fourth gear, the fourth shaft is connected at one end to the drive shaft of the electric generator and at another end to the second freewheel device the first freewheel device and the second freewheel device are engaged one at a time respectively when the rack moves upwards and when the rack moves downwards.

4. The ocean wave power plant according to claim 1, wherein the flexible transmission member is comprised of at least one of the following materials: rope, wire, chain, a rack.

5. The ocean wave power plant according to claim 1, wherein a bidirectional motion up and down of the transmission member is converted to a unidirectional motion of an output shaft, wherein the bidirectional motion up and down of the transmission member is transferred via an input gear to a shaft, wherein the shaft comprises a first freewheel device and a second freewheel device, a first gear is connected to an outer housing of the first freewheel device, a second gear is connected to an outer housing of the second freewheel device, the first gear is further connected to a fourth gear, the second gear is further connected to a third gear, the fourth gear is further connected to a fifth gear, the third gear is further connected to an end of the output shaft, the fifth gear is connected to another end of the output shaft, wherein the first freewheel device and the second freewheel device are made to be engaged one at a time respectively when the input gear is respectively turning around in one defined direction, or in an opposite direction.

6. The ocean wave power plant according to claim 1, wherein the submersible uplift floating body is arranged with an extended watertight encapsulation from a top side of the submersible uplift floating body, wherein the encapsulation at least partly encapsulates the support structure and the transmission member, wherein the encapsulation is arranged to pass through the through hole of the floating body.

7. The ocean wave power plant according to claim 1, wherein the transmission member is a rack, and the motion constraining device is a single ball joint.

8. The ocean wave power plant according to claim 1, wherein the anchoring mass is a self-lifting anchor device comprising a storage cavity adapted to be partly filled with gravel, wherein a top surface of the self-lifting anchor device is provided with a recess comprising a fastening bracket, wherein the fastening bracket is located close to the gravel in a bottom of the recess, a first hose is connected to a first valve, a second hose is connected to a second valve, and both the first hose and the second hose are connected to openings on a surface of the self-lifting anchor device, at least one additional valve is arranged in fluid communication with the ocean.

9. The ocean wave power plant according to claim 8, further comprising a method of deployment, wherein the method comprises:
 filling compressed air in the storage cavity of the self-lifting anchor device via the first valve and/or the second valve thereby the self-lifting anchor device will float on the ocean, towing the ocean wave power plant together with the self-lifting anchor device to a location the ocean wave power plant is supposed to be located,
 sinking the self-lifting anchor device by opening the first valve and/or the second valve and then filling water inside the storage cavity via the first valve and/or the second valve while the compressed air in the storage cavity is aired out through the first valve and/or the second valve.

10. The ocean wave power plant according to claim 9, wherein the method further comprises refilling compressed air in the storage cavity of the self-lifting anchor device via the first valve and/or the second valve, thereby the self lifting anchor device will again float on the ocean.

11. The ocean wave power plant according to claim 1, wherein the support structure is arranged with dampers in a top position of the support structure.

12. The ocean wave power plant according to claim 1, wherein a damper is arranged on a top surface of the uplift floating body.

13. The ocean wave power plant according to claim 1, wherein the floating body is an elongated shaped body.

14. The ocean wave power plant according to claim 1, wherein the floating body is a round shaped body.

15. The ocean wave power plant according to claim 1, wherein a flywheel is attached to a rotating shaft in operational contact with the power generating subsystem, wherein the flywheel is provided with a mass to enable synchronization of a natural frequency of the ocean wave power plant with a dominant ocean wave frequency for a particular location where the ocean wave power plant is deployed.

16. The ocean wave power plant according to claim 1, wherein the at least two openings are arranged closer to the through hole than to outer edges of the floating body.

17. The ocean wave power plant according to claim 1, wherein the first cavity comprises a plurality of first cavities and the second cavity comprises a plurality of corresponding second cavities, wherein a bottom surface of the plurality of second cavities are open to the ocean via the at least two openings located on the bottom side of the floating body, wherein the one way vents that are arranged with openings on the top surface of the floating body are located on top of each of the plurality of first cavities, wherein the channels that are connected to the second cavity to provide the paths for venting air comprises channels that are connected to each of a plurality of second cavities to provide paths for venting air when water is filled in the plurality of second cavities.

* * * * *